(12) United States Patent
Bjerke et al.

(10) Patent No.: US 11,414,842 B2
(45) Date of Patent: Aug. 16, 2022

(54) RETENTION SYSTEM FOR MOTOR GRADER BITS

(71) Applicant: Caterpillar Inc., Peoria, IL (US)

(72) Inventors: Nathan R. Bjerke, Peoria, IL (US); Thomas Marshall Congdon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 184 days.

(21) Appl. No.: 16/921,205

(22) Filed: Jul. 6, 2020

(65) Prior Publication Data

US 2022/0002980 A1    Jan. 6, 2022

(51) Int. Cl.
*E02F 9/28* (2006.01)
*B23B 31/107* (2006.01)

(52) U.S. Cl.
CPC ........ *E02F 9/2833* (2013.01); *B23B 31/1077* (2013.01); *E02F 9/2825* (2013.01)

(58) Field of Classification Search
CPC .. B23B 31/1077; E02F 3/8152; E02F 9/2825; E02F 9/2833; E02F 9/2841
See application file for complete search history.

(56) References Cited

U.S. PATENT DOCUMENTS

| | | | |
|---|---|---|---|
| 3,575,467 A | 4/1971 | Davis | |
| 4,655,508 A | 4/1987 | Tomlinson | |
| 4,678,238 A | 7/1987 | Emmerich | |
| 8,770,311 B2 | 7/2014 | Rivera et al. | |
| 8,925,221 B2 * | 1/2015 | Jeske | E02F 9/2891 37/455 |
| 8,950,092 B2 * | 2/2015 | Campomanes | E02F 9/2891 37/455 |
| 9,074,350 B2 * | 7/2015 | LaHood | E02F 9/2841 |
| 9,388,553 B2 * | 7/2016 | Campomanes | E02F 9/2825 |
| 9,534,356 B2 * | 1/2017 | LaHood | E02F 9/2825 |
| 9,556,595 B2 | 1/2017 | Congdon et al. | |
| 9,732,495 B2 | 8/2017 | Congdon | |
| 10,047,503 B2 * | 8/2018 | Lahood | E02F 9/2891 |
| 10,047,504 B2 * | 8/2018 | Kunz | E02F 9/2891 |
| 10,053,839 B2 * | 8/2018 | Serrurier | E02F 9/28 |
| 10,364,553 B2 | 7/2019 | Snyder | |
| 10,544,568 B2 * | 1/2020 | Serrurier | E02F 9/2833 |
| 11,225,779 B2 * | 1/2022 | Wells | F16B 21/12 |
| 2007/0107274 A1 | 5/2007 | Livesay et al. | |
| 2018/0179730 A1 | 6/2018 | Congdon et al. | |
| 2018/0195255 A1 | 7/2018 | Parzynski et al. | |
| 2019/0316325 A1 | 10/2019 | Parzynski, Jr. et al. | |
| 2019/0316326 A1 | 10/2019 | Parzynski, Jr. et al. | |

FOREIGN PATENT DOCUMENTS

| | | |
|---|---|---|
| JP | 6282765 B2 | 2/2018 |
| KR | 20150137346 | 12/2015 |

* cited by examiner

*Primary Examiner* — Gary S Hartmann
(74) *Attorney, Agent, or Firm* — Law Office of Kurt J. Fugman LLC

(57) ABSTRACT

A work tool or a wear member includes a working portion or a wear portion, and a shank extending from the working portion or the wear portion, defining a longitudinal axis, and a first lock receiving groove that defines an axis of rotation that is perpendicular to the longitudinal axis of the shank.

10 Claims, 26 Drawing Sheets

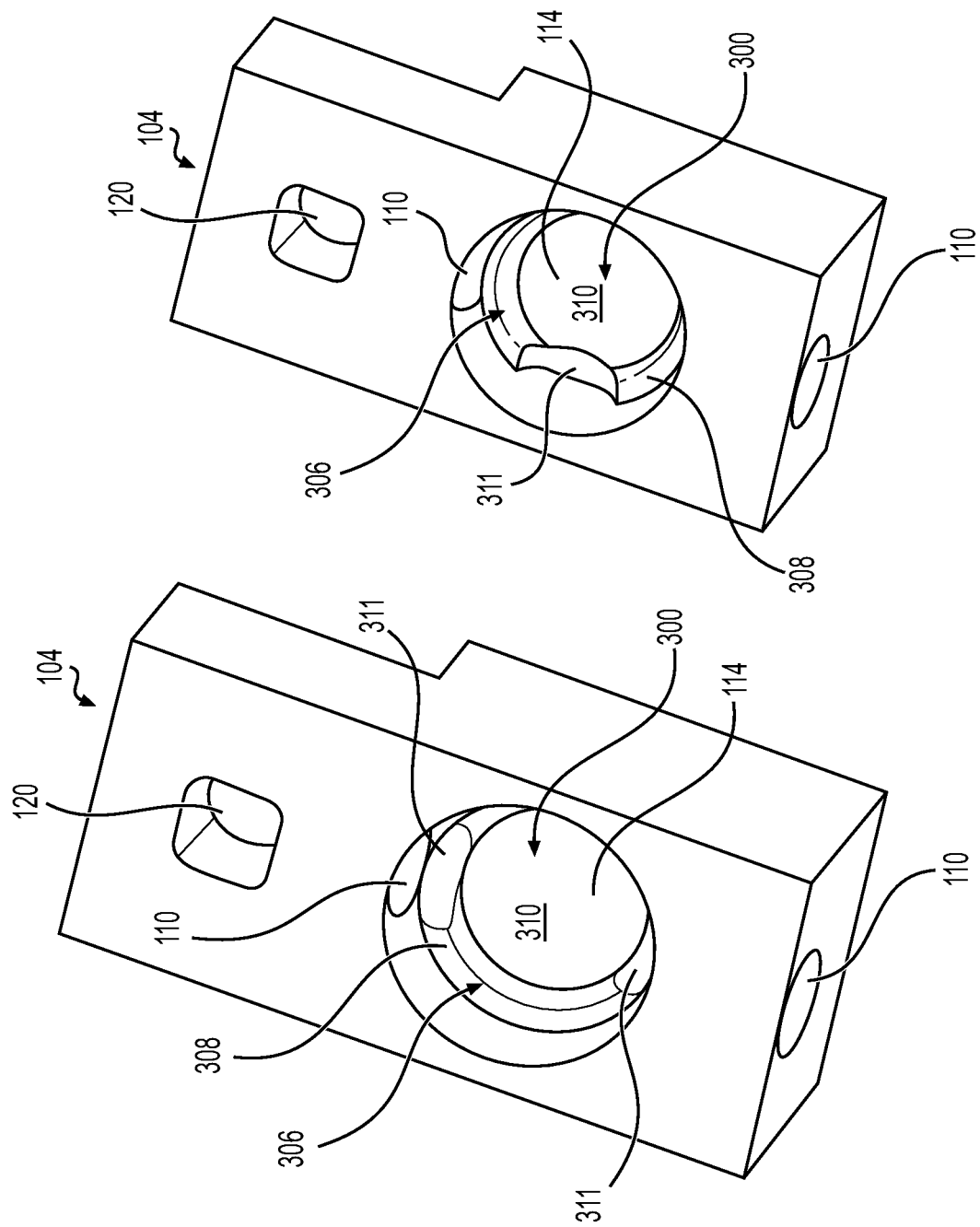

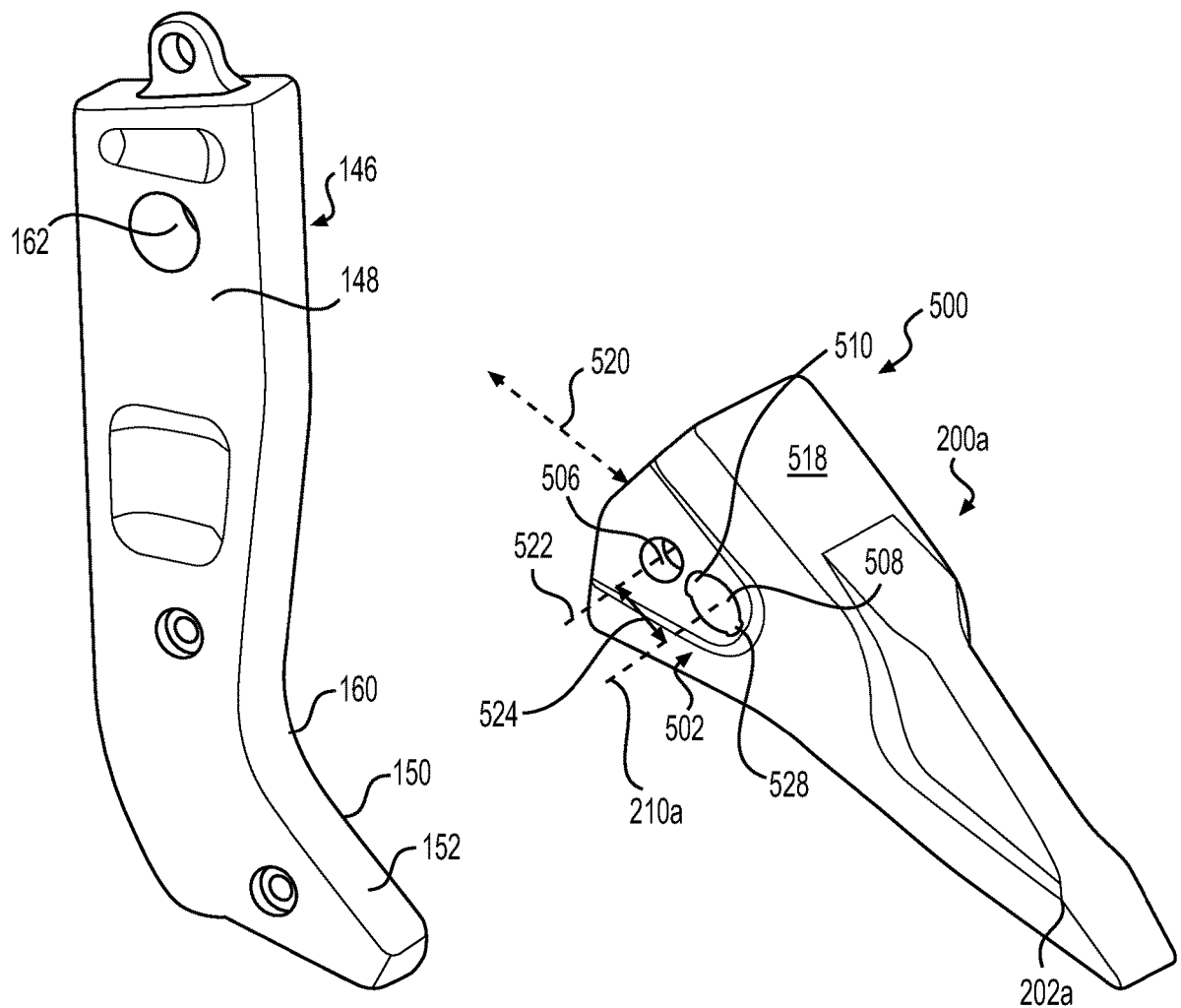
FIG. 29
FIG. 30
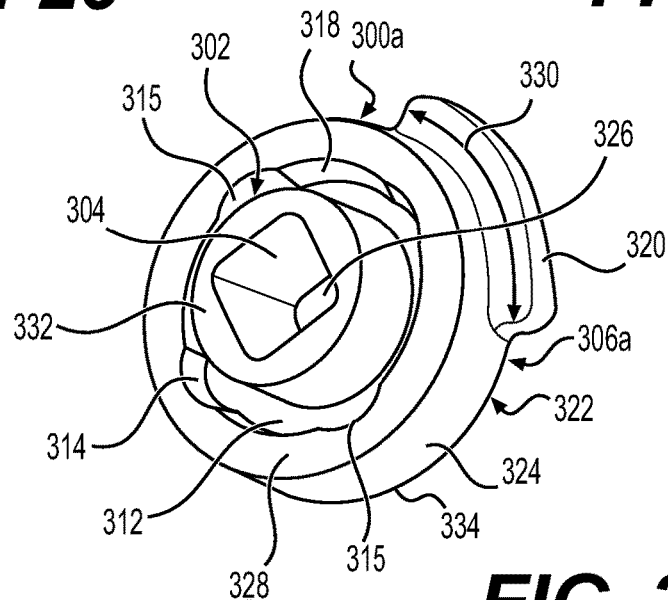
FIG. 31

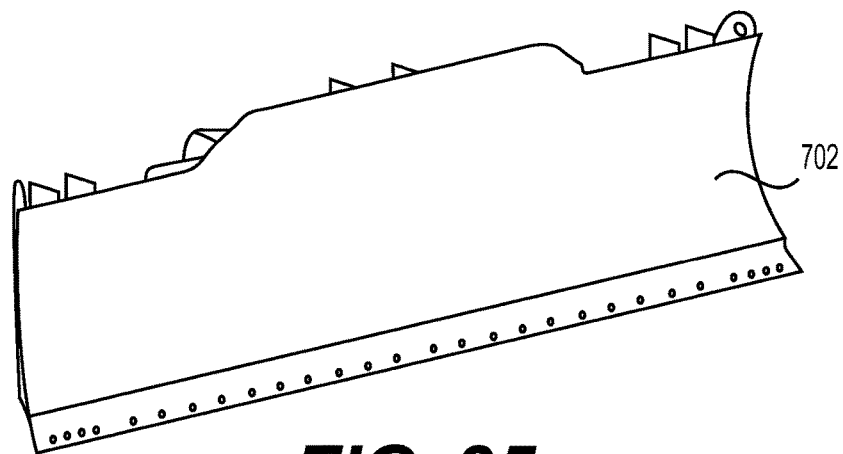
FIG. 35
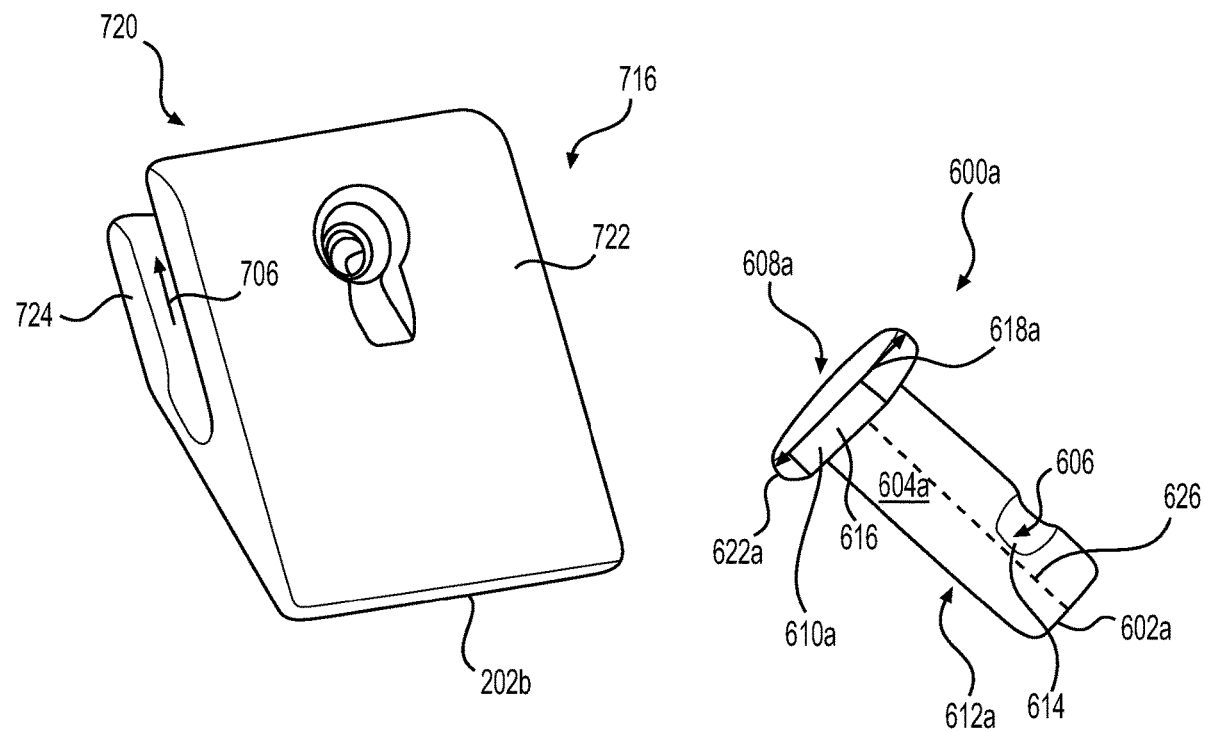
FIG. 36  FIG. 37

RETENTION SYSTEM FOR MOTOR GRADER BITS

TECHNICAL FIELD

The present disclosure relates to retention assemblies for attaching work tools or wear members such as motor grader bits to the adaptor board used by motor graders or other similar equipment. More specifically, the present disclosure relates to a retention system that may be easily used for attaching such work tools or wear members to the adaptor board by rotating a retainer ninety degrees using a square driver or the like.

BACKGROUND

Machines such as motor graders employ work tools or wear members such as motor grader bits to rip up asphalt or other ground material. Various systems have been employed to attach these work tools or wear members to the adapter board so that they may be replaced.

For example, U.S. Pat. Application Publ. No. 2019/0316326 A1 discloses a pin retention system that allows a pin to be inserted through a thru-hole located in the shank of the work tool or wear member to hold the work tool or wear member to the adaptor board as best seen in FIG. 3 of that publication.

As can be seen by looking at FIG. 3, the retention system using such a pin does not allow the use of a square driver that is commonly found and used in the field for attaching various wear members. Also, the bottom portion of the adaptor board needs to be wider than desirable to allow enough room for the pin to fit through the shank of the bit and not interfere with the top portion of the adaptor board.

Accordingly, there exists a need for a retention system that allows a wear member or a work tool to be attached to an adapter board using a square shaped driver or the like, and that requires less material.

SUMMARY OF THE DISCLOSURE

An adaptor board assembly according to an embodiment of the present disclosure for attaching grading bits to a machine is provided. The adaptor board assembly may comprise an adaptor board including a top moldboard attachment portion, and a bottom grading bit retention portion. Also, a lock, and a retainer may be provided. The bottom grading bit retention portion defines a shank receiving aperture defining a longitudinal axis, and a lock receiving aperture that is in communication with the shank receiving aperture. The lock receiving aperture defines an axis of rotation that forms an angle with the longitudinal axis of the shank receiving aperture in a plane containing the longitudinal axis, and the axis of rotation ranging from 80 degrees to 100 degrees.

A retaining system according to an embodiment of the present disclosure comprises a lock including a drive portion, an axis of rotation, a radial direction, and a circumferential direction. A shank locking portion is also provided that comprises a skirt that is connected to the drive portion by a web. The skirt extends axially from the web toward the drive portion forming an annular cavity, defining at least one detent receiving aperture that is disposed in the annular cavity.

A work tool or a wear member according to an embodiment of the present disclosure includes a working portion or a wear portion, and a shank extending from the working portion or the wear portion, defining a longitudinal axis, and a first lock receiving groove that defines an axis of rotation that is perpendicular to the longitudinal axis of the shank.

BRIEF DESCRIPTION OF THE DRAWINGS

FIG. 7 is a rear oriented perspective view of the section of the adaptor board and the retaining assembly of FIG. 6 with the lock in an unlocked configuration ready to receive the shank of a bit. The bit including its shank is not present to more clearly show the lock.

FIG. 8 shows the lock of FIG. 7 in a locked configuration by rotating the lock ninety degrees.

FIG. 29 is an alternate perspective view of the ripper shank of FIG. 21 shown in isolation, revealing the left side of the ripper shank and the counterbore hole through which the customized pin extends in use.

FIG. 30 is a perspective view of the ripper tip of FIG. 23 shown in isolation with the retaining system removed, depicting the various apertures that receive the components of the retaining system.

FIG. 31 is a perspective view of the lock of FIGS. 23 thru 28 shown in isolation.

FIG. 35 is a front perspective view of a blade that may be used on the machine of FIG. 34 shown in isolation. The blade may have cutting edges or other work tools or wear members attached to the blade using various embodiments of a retaining system of the present disclosure.

FIG. 36 is a front oriented perspective view of a cutting edge that is configured with a pin receiving thru-hole, a pin head receiving recess, and a ramped pry slot similar or identical to the features that are shown in FIGS. 21 thru 26.

FIG. 37 is a perspective view of a pin with an orientation feature such as a flat or an indentation, and a wing receiving slot on the peripheral surface of the shank similar to that shown in FIG. 33.

DETAILED DESCRIPTION

Figure 1:
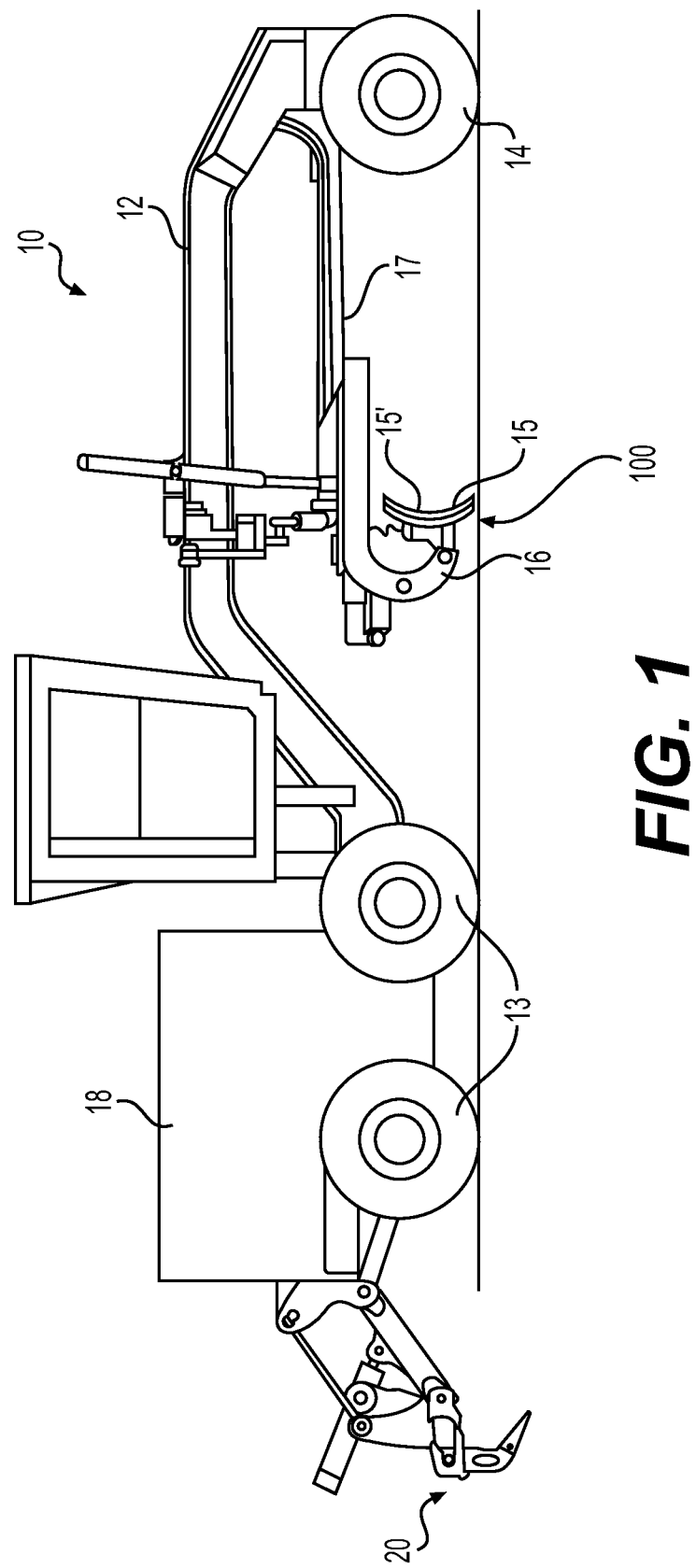
FIG. 1 is a side view of a motor grader that may employ a retaining system according to an embodiment of the present disclosure for attaching a work tool or a wear member such as a ripper tip to a ripper shank or a grading bit to an adaptor board, forming a ripper assembly or an adaptor board assembly that is attached to the machine.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

An adaptor board assembly that may employ a retaining system (may be referred to as a retaining assembly) using a lock, a retainer, and a bit configured according to various embodiments of the present disclosure will be discussed. Then, the retaining system itself will be described. Various replacement parts will also be discussed such as the wear member or work tool that has features to mate with the retaining system according to various embodiments of the present disclosure. Later, a ripper shank and ripper tip subassembly using a lock, a retainer, and a pin configured according to further various embodiments of the present disclosure will be discussed. The replacement parts for these embodiments may be similarly or identically configured as those for the retaining system of the adaptor board assembly in some embodiments, and vice versa.

First, a machine will now be described to give the reader the proper context for understanding how various embodiments of the present disclosure are used. It is to be understood that this description is given as exemplary and not in any limiting sense. Any embodiment of an apparatus or method described herein may be used in conjunction with any suitable machine.

Referring to FIG. 1, a machine 10 such as a motor grader is depicted. The machine 10 has a frame 12 and a ground engaging propulsion system including two sets of rear wheels 13 and a set of front wheels 14. A blade assembly 15' or board assembly 15 is mounted on a blade tilt adjustment mechanism 16 that is supported by a rotatable circle assembly 17 positioned beneath frame 12. A variety of hydraulic cylinders may be provided for controlling the position of the board assembly 15 or blade assembly 15'. A prime mover such as engine 18 provides the power necessary to propel the machine 10 as well as operate the various actuators and systems of the machine. In a hydrostatically operated machine, the engine 18 powers a hydro static pump (not shown) which in turn drives a hydrostatic motor (not shown) to propel the machine 10. The hydro static pump may also drive other hydraulic systems of the machine. A ripper assembly 20 may be mounted at a rear section of the frame 12 of the machine 10. Although ripper assembly 20 is mounted on a motor grader, the ripper assembly may be mounted on other types of machines such as a dozer, a tractor and the like. Accordingly, this machine is provided as a non-limiting example and the applications for the retaining systems discussed herein are also provided as non-limiting examples.

As alluded to previously, an adaptor board assembly 100 may be provided that allows a work tool/wear member 200 to be attached or detached from the machine 10. The adaptor board assembly 100 may described as follows focusing on FIGS. 2 thru 10.

Figure 2:
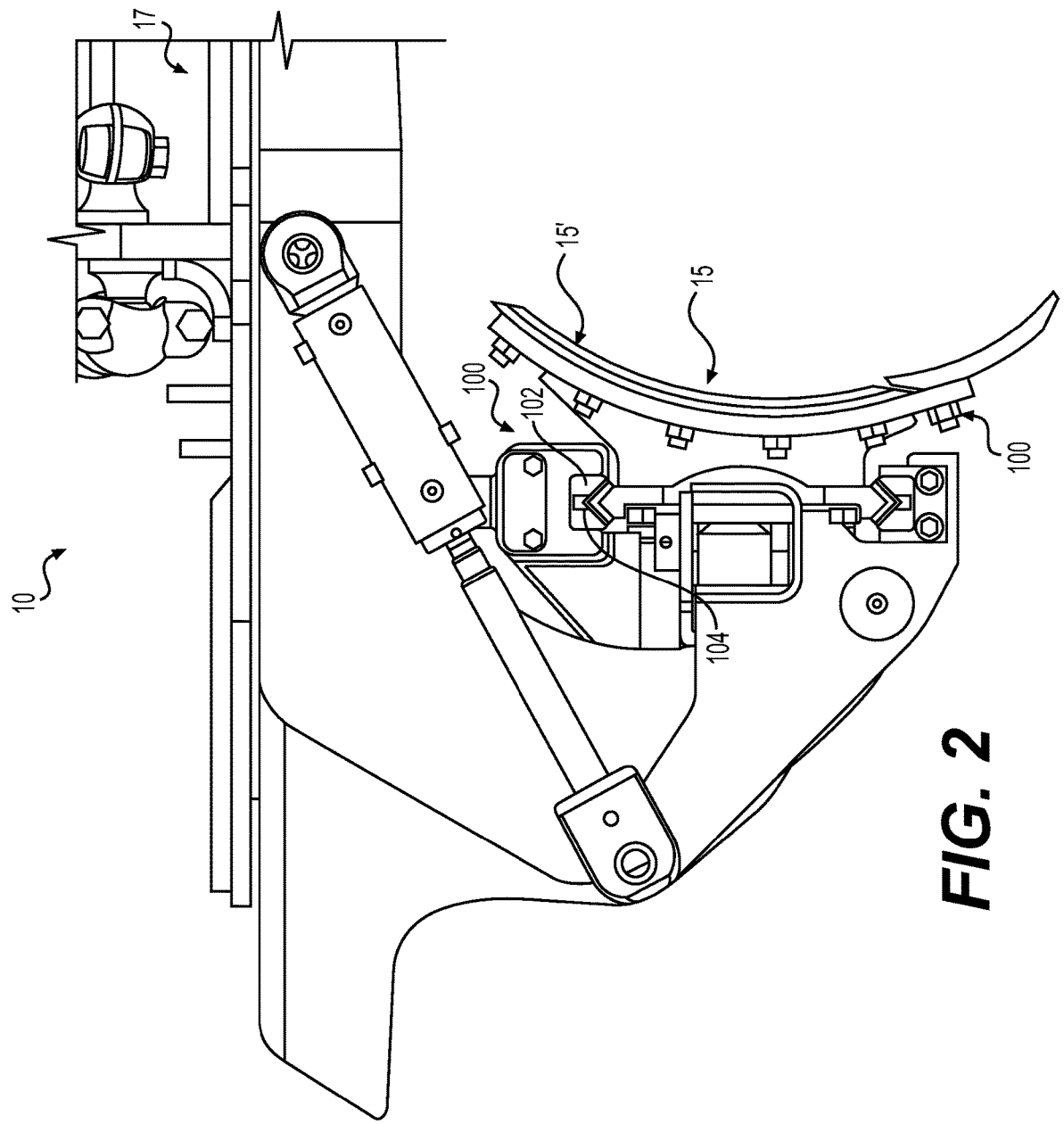
FIG. 2 is an enlarged side view of the adaptor board assembly of FIG. 1.
Figure 3:
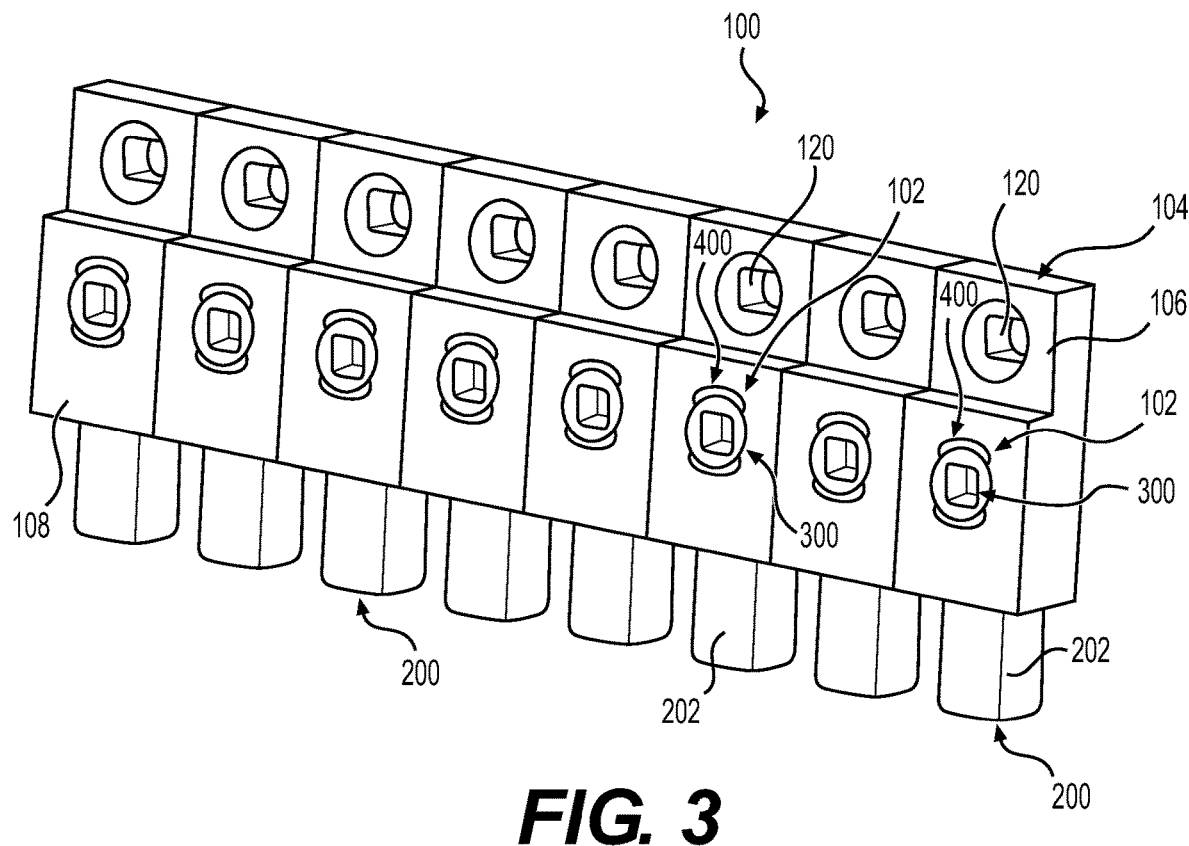
FIG. 3 is a front oriented perspective view of the adaptor board assembly of FIGS. 1 and 2 removed from the machine showing a plurality of bits attached to the adaptor board using a retaining system (or retaining assembly) according to an embodiment of the present disclosure.
Figure 4:
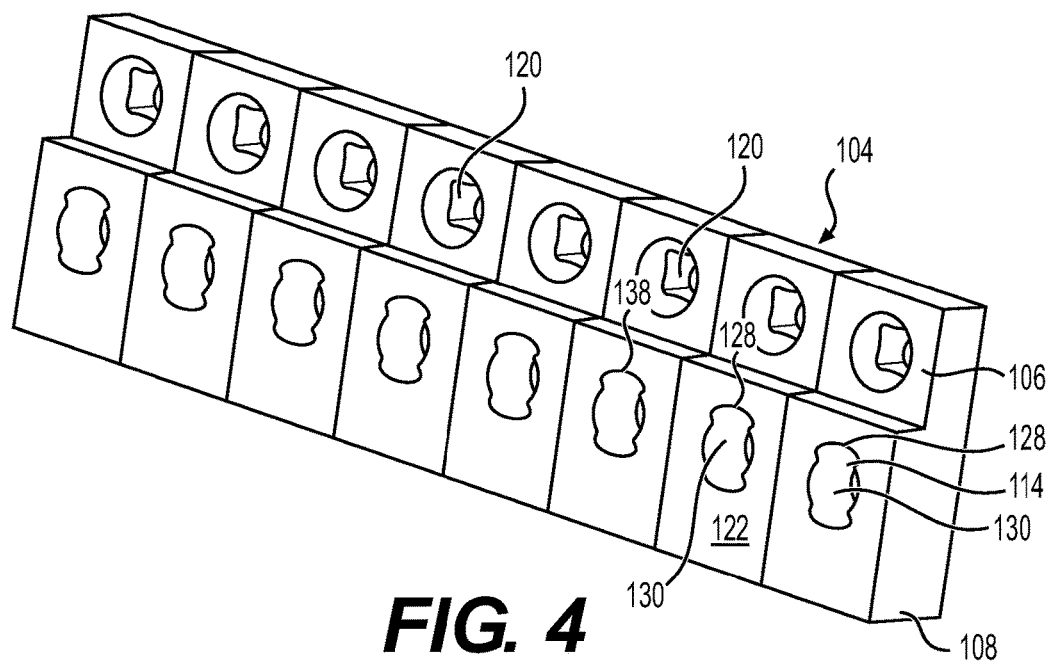
FIG. 4 is a front oriented perspective view of the adaptor board of FIG. 3 with the retaining assemblies and the plurality of bits removed.
Figure 6:
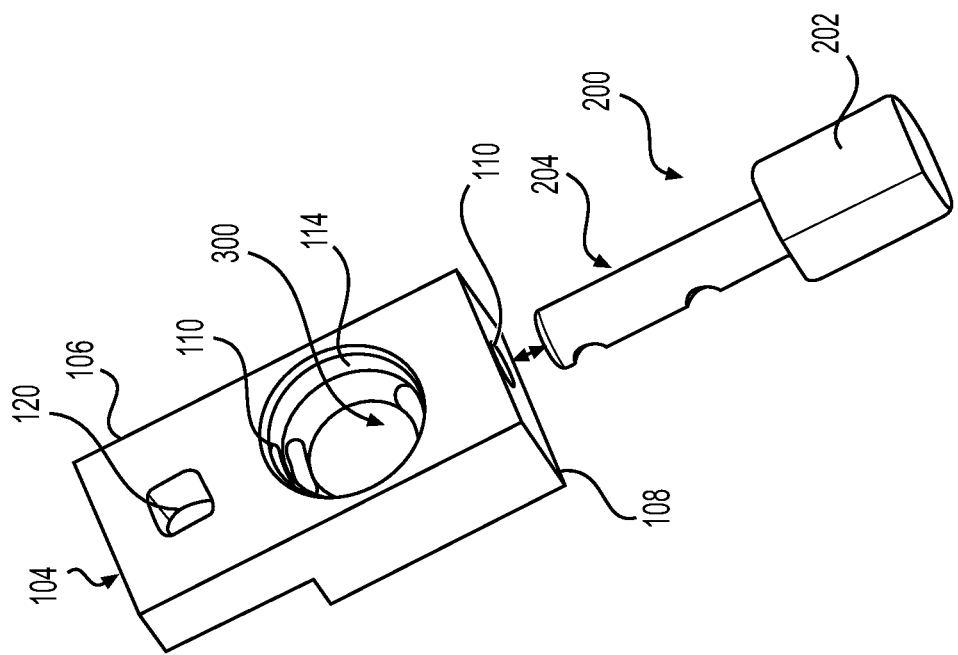
FIG. 6 is a rear oriented perspective view of the components of FIG. 5 illustrating how the bit may be inserted or removed from the shank receiving aperture of the adaptor board when the lock of the retaining assembly is in the unlocked configuration.
Figure 5:
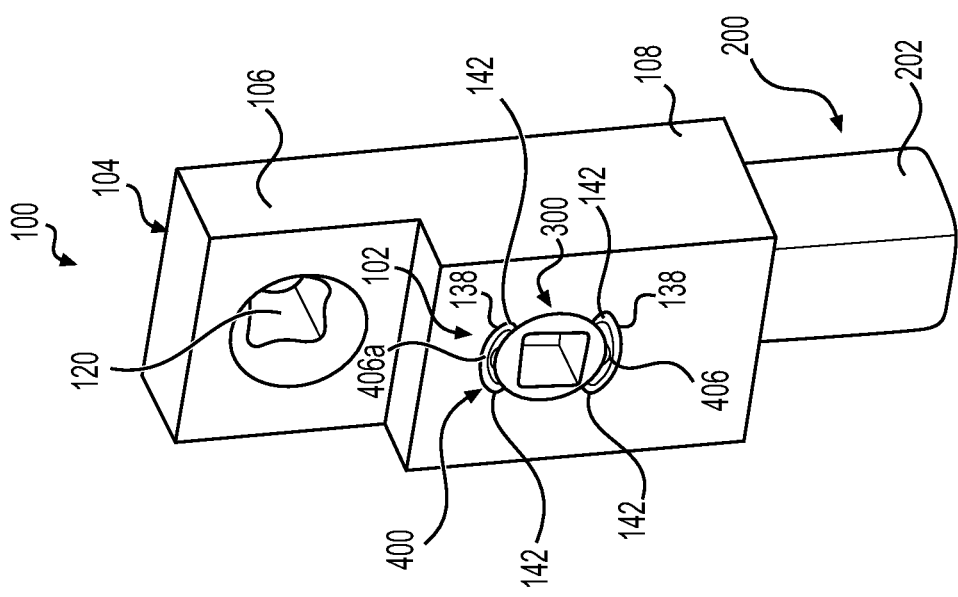
FIG. 5 is a front oriented perspective view of a section of the adaptor board of FIG. 3 showing a single instance of a bit attached to the adaptor board using a single retaining assembly according to an embodiment of the present disclosure.

Starting with FIGS. 2, 3 and 5, an adaptor board assembly 100 for attaching grading bits (e.g. see reference numerals 200) to a grading machine 10 using a retaining system 102 according to an embodiment of the present disclosure can be seen. The adaptor board assembly 100 may comprise an adaptor board 104 including a top moldboard attachment portion 106, and a bottom grading bit retention portion 108. The grading bits (e.g. see 200) include a working portion/wear portion 202, and a shank 204 (see FIG. 6) extending from the wear portion/working portion. The retaining system 102 may include a lock 300 for holding the bit into place, and a retainer 400 for holding the lock 300 into the bottom grading bit retention portion 108 of the adaptor board 104. The top moldboard attachment portion 106 may define a fastener receiving aperture 120 for attaching the adaptor board 104 to the mold board. However, other forms of attachment are possible including welding, etc.

Figure 10:
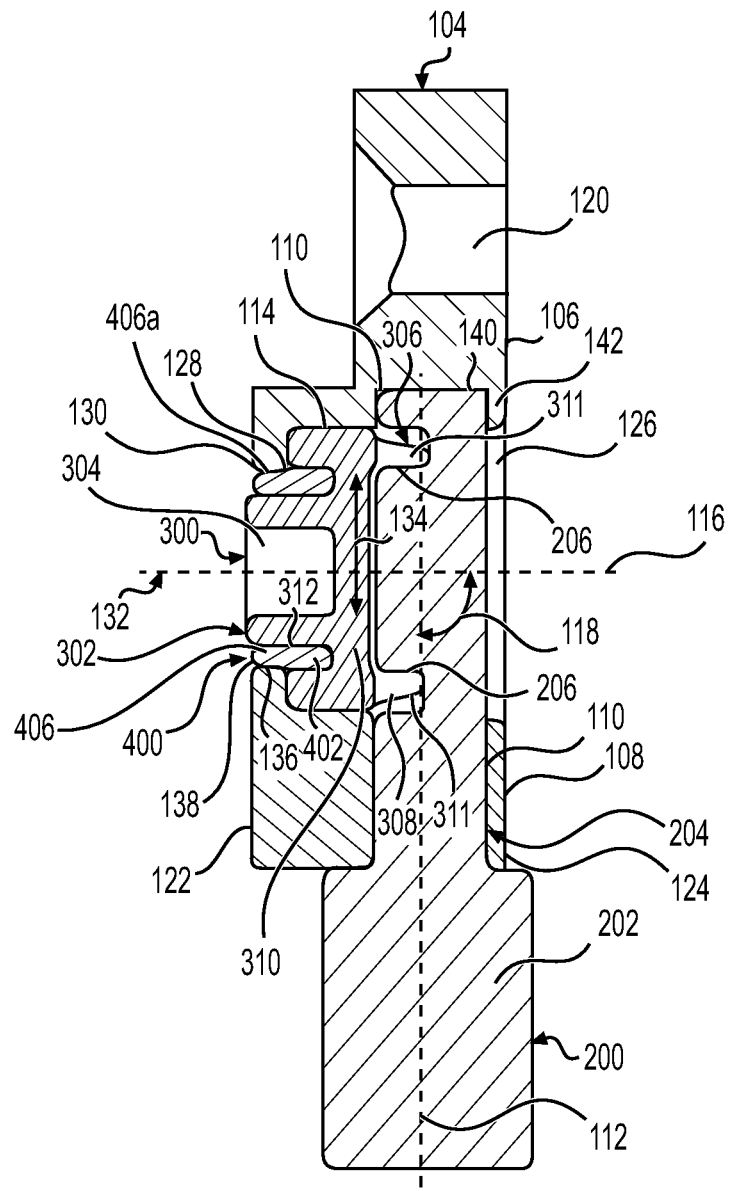
FIG. 10 is side sectional view of FIG. 5 depicting the retainer and the lock engaging the apertures of the adaptor board and the shank of the bit. The apertures of the skirt of the lock that allow the shank of the bit to be inserted or removed may also be seen as the lock is shown in the unlocked configuration.
Figure 11:
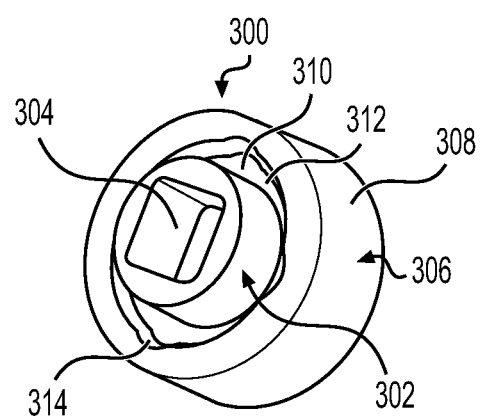
FIG. 11 is a front oriented perspective view of the lock employed in FIGS. 5 thru 10 shown in isolation.

As best seen in FIGS. 6 thru 8, and 10, the bottom grading bit retention portion 108 may define a shank receiving aperture 110 defining a longitudinal axis 112, and a lock receiving aperture 114 (as best seen in FIG. 10) that is in communication with the shank receiving aperture 110, and that is disposed toward the interior of the bottom grading bit retention portion 108 of the adaptor board 104. The lock receiving aperture 114 may define an axis of rotation 116 (see FIG. 10) that forms an angle 118 with the longitudinal axis 112 of the shank receiving aperture 110 in a plane (i.e. the sectioned plane of FIG. 10) containing the longitudinal axis 112, and the axis of rotation 116 ranging from 80 degrees to 100 degrees (e.g. approximately 90 degrees, +/−5 degree). That is to say, the aperture may be formed with one or more surfaces of revolution (e.g. cylindrical, conical) that allow a lock to rotate therein.

With continued reference to FIG. 10, the bottom grading bit retention portion 108 may include a front face 122, and a rear face 124. A lock insertion aperture 126 may extend from the rear face 124 to the lock receiving aperture 114, allowing the lock 300 and the retainer 400 to be installed into the adaptor board 104 and held into place in a manner that will be discussed later herein before attaching the bit.

To that end, the bottom grading bit retention portion 108 may further define a retainer receiving aperture 128 that is in communication with the lock receiving aperture 114, and a lock drive portion access aperture 130 (see also FIG. 3) that extends from the front face 122 to the lock receiving aperture 114.

More particularly as seen in FIG. 10, the lock drive portion access aperture 130 defines a central axis 132 that is coincident with the axis of rotation 116, a radial direction 134, and at least one surface of revolution 136 (e.g. a conical surface, a cylindrical surface, etc.) centered about the axis of rotation 116. The retainer receiving aperture 128 may include at least one slot 138 that is radially offset from the lock drive portion access aperture 130 and is in communication therewith.

Looking now at FIGS. 7 thru 15, the lock 300 may include a drive portion 302 defining a drive recess 304, a shank locking portion 306 comprising a skirt 308, and a web 310 that connects the drive portion 302 to the skirt 308. Other configurations of these features is possible in other embodiments of the present disclosure.

As best seen in FIG. 10, the skirt 308 (may also be referred to as a rim) may extend axially from the web 310 toward the drive portion 302 (i.e. axially on the same side of the web as the drive portion), defining an annular cavity 312 between the drive portion 302 and the skirt 308 that is configured to receive the retainer 400. In FIGS. 11 thru 15, it can be understood that at least one detent receiving aperture 314 may be disposed in the annular cavity 312. Once assembled as best seen in FIG. 10, the retainer 400 is disposed in the annular cavity 312 (see also FIGS. 27 and 28 that show the same concept with another embodiment of the retaining system).

Figure 17:
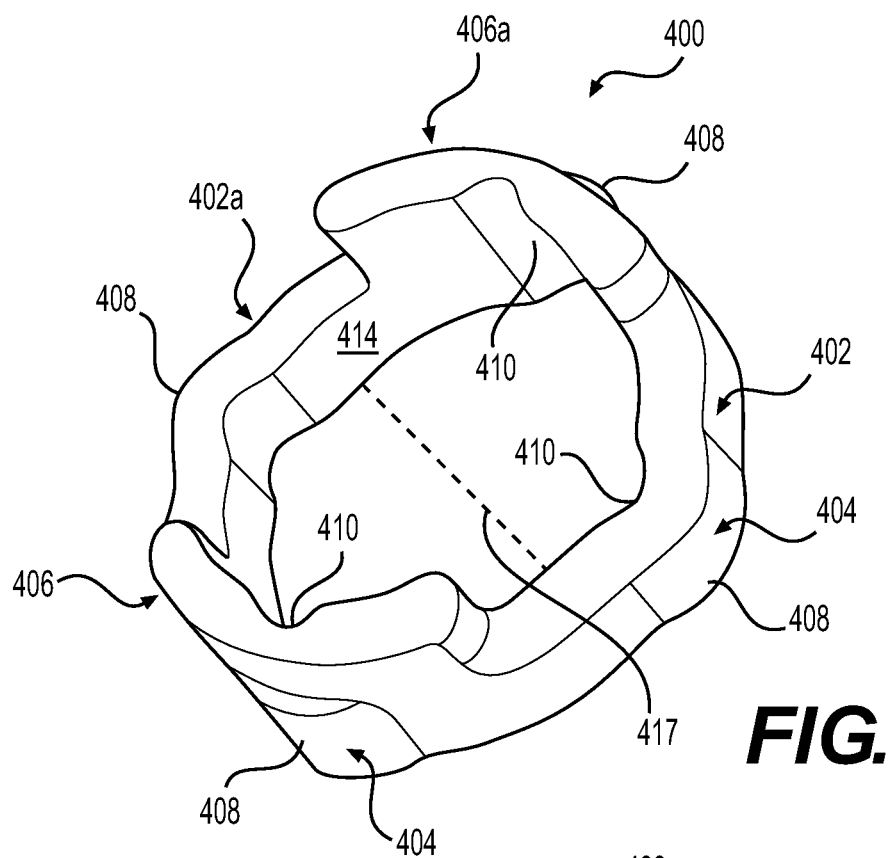
FIG. 17 is a perspective view of the retainer employed in FIGS. 5 thru 10 shown in isolation. The detents, the undulating ring portion, and the tabs are clearly shown.

Looking at FIG. 17, the retainer 400 may include an undulating ring portion 402 comprising at least one detent 404 that is configured to engage the at least one detent receiving aperture 314 of the lock 300. The detents have a bulge or protrusion 408 radially on one side and a flex groove 410 radially on the opposite side to allow the detents to deflect radially inwardly as the lock 300 is rotated.

A tab 406 may extend axially from the undulating ring portion 402. As seen in FIGS. 5 and 10, one or more tabs 406, 406a may be disposed in the slot(s) 138 that is radially offset from the lock drive portion access aperture 130.

The tabs may serve two functions. First, the tabs may abut the ends 142 of the slot 138 (since the slots extend less than 180 degrees about the axis of rotation), helping to prevent rotation of the retainer so that only the lock rotates to achieve the locked and unlocked configuration. Second, there may be dimensional interference between the tab, the drive portion of the lock, and the surface of revolution of the adaptor board so that the retainer and the lock are held in the adaptor board during assembly.

As best seen in FIGS. 7 thru 10, the skirt 308 of the lock 300 may extend axially from the web 310 away from the drive portion 302, forming the shank locking portion 306. Furthermore, the skirt 308 may also define at least one shank receiving aperture 311, and the shank 204 may define at least one skirt receiving notch 206 (see also FIG. 16). For the embodiment shown in these figures, there are two notches 206 and two apertures 311.

Figure 9:
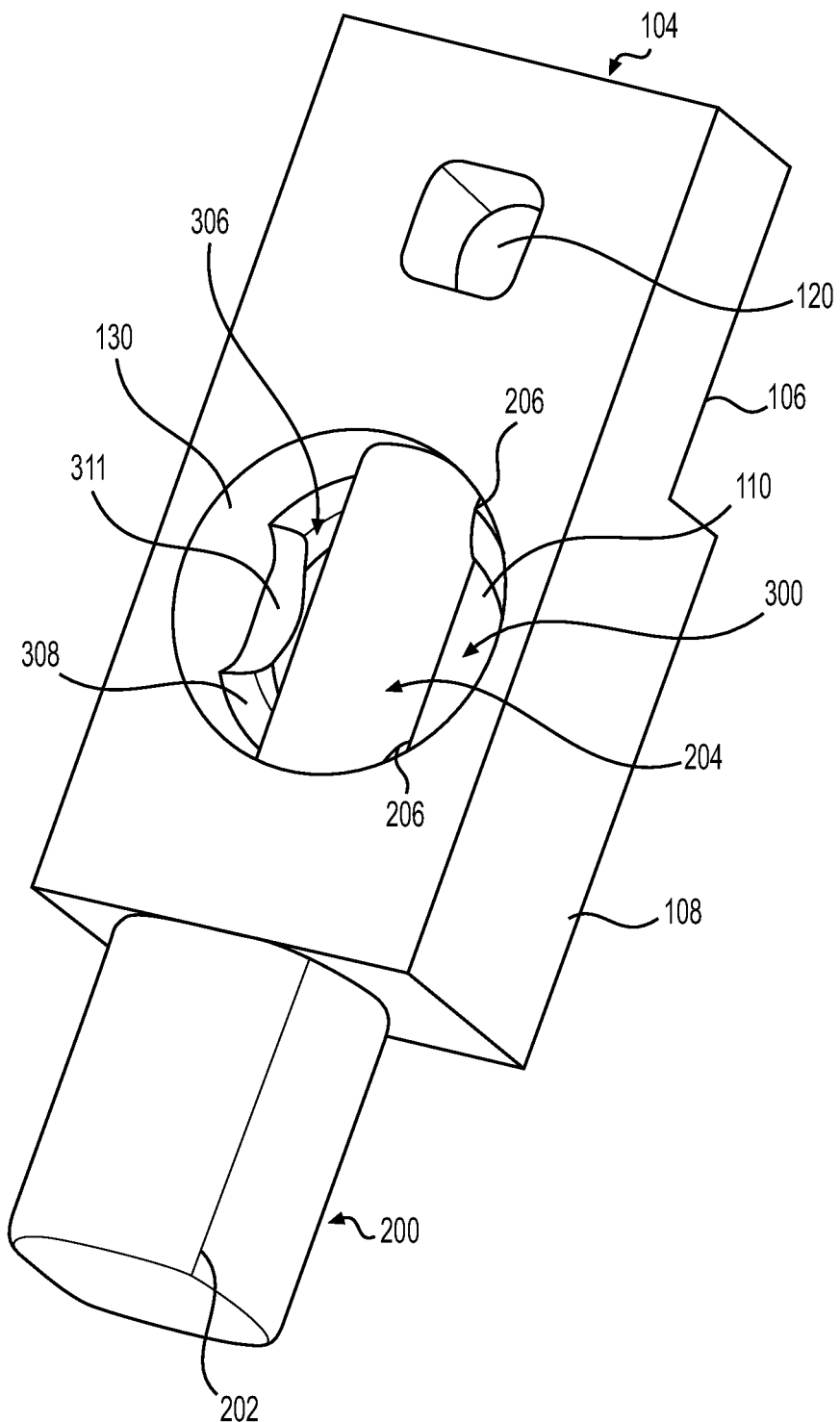
FIG. 9 shows the lock of the retaining assembly of FIG. 8 mating with the shank of a bit, holding the bit into place.

As a result as shown in FIG. 10, the shank 204 and its associated aperture 110 pass longitudinally completely through lock 300. Consequently, the shank 204 abuts or nearly abuts a blind bottom surface 140 and is trapped along a direction parallel to the axis of rotation 116 by a ledge 142, while at the same time the working portion/wear portion 202 of the work tool/wear member 200 abuts (or nearly abuts) the bottom grading bit retention portion 108 of the adaptor board 104. Once the lock 300 is rotated into a locking configuration as depicted in FIG. 9, the skirt 308 enters both notches 206, providing a robust retention of the bit. This various features may be differently configured in other embodiments of the present disclosure. For example, only one notch may be used in a scenario where the shank does not pass longitudinally completely through the lock, etc.

Next, a retaining system 102 that may be provided as replacement kit or a repair kit will be discussed with reference to FIGS. 10 thru 15, and 17 thru 19. The retaining system may comprise a lock 300 including a drive portion 302 defining a drive recess 304, an axis of rotation 116, a radial direction 134, and a circumferential direction 316 (see FIGS. 12 and 13). That is to say, the lock includes a body and/or a surface of revolution (e.g. cylindrical, conical) that allows the lock to rotate in a lock receiving aperture as previously described herein. The shank locking portion 306 may comprise a skirt 308 that is connected to the drive portion 302 by a web 310. The skirt 308 may extend axially from the web 310 toward the drive portion 302 (i.e. in the same axial direction as the drive portion) forming an annular cavity 312, defining at least one detent receiving aperture 314 that is disposed in the annular cavity 312. A retainer 400 may also be provided that is configured to fit within the annular cavity 312.

On the other hand, the skirt 308 of the lock 302 may also extend axially from the web 310 away from the drive portion 302 in the opposite direction, forming the shank locking portion 306. As alluded to earlier herein, the skirt 308 may also define at least one shank receiving aperture 311.

Figure 12:
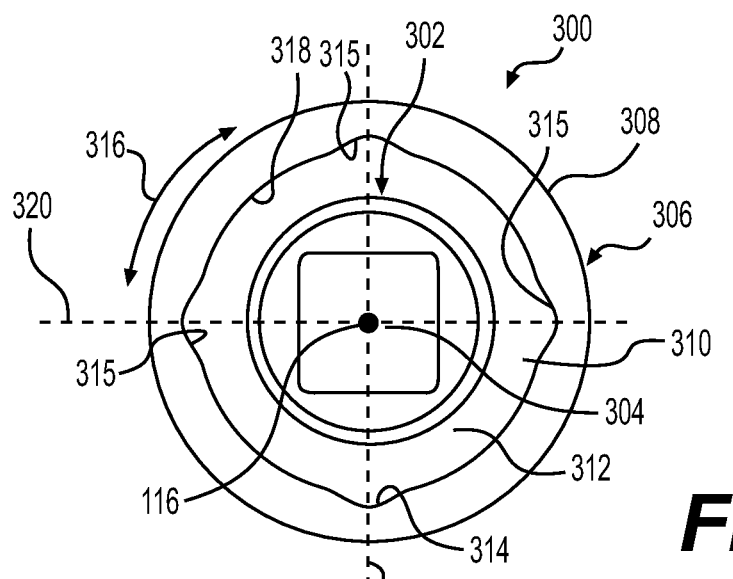
FIG. 12 is a front view of the lock of FIG. 11. The square shaped drive aperture and the detent apertures are clearly shown.

More specifically, FIG. 12 illustrates that the skirt 308 may include an interior wall 318 (e.g. a surface) facing radially toward the drive portion 302 of the lock 300, and the at least one detent receiving aperture 314 may be disposed on the interior wall 318. This may not be the case for other embodiments of the present disclosure. For example, the aperture 314 may be on the drive portion 302 in other embodiments. In such a case, the retainer 400 and its detents 404 would be reversed, etc.

In some embodiments of the present disclosure, the drive recess 304 may include a rectangular configuration. Other configurations are possible including other polygonal shapes, asymmetrical shapes, etc. Also, instead of a drive recess, the drive portion 302 may have other external configurations with flats to allow a socket to rotate the lock 300, etc.

Figure 18:
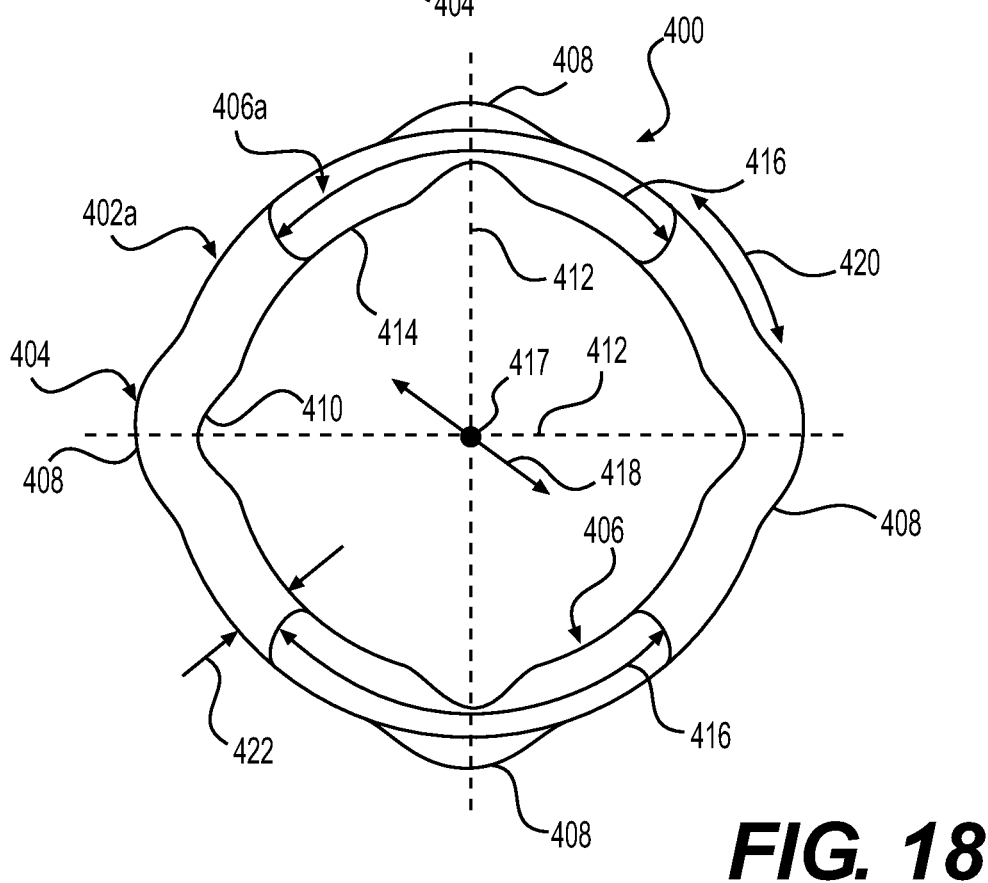
FIG. 18 is a front view of the retainer of FIG. 17.

As mentioned earlier herein, the retainer 400 may be disposed in the annular cavity 312. Looking at FIGS. 17 thru 19, the retainer 400 may include a wavy annular body 402a having at least one detent 404 that is configured to mate with the at least one detent receiving aperture 314. One or more tab(s) 406 may extend axially away from the wavy annular body 402a that is disposed radially adjacent to the drive portion 302 of the lock 300 as seen in FIG. 10. As shown, two such tabs that are radially aligned may be provided. Similarly, the least one detent of the retainer includes four detent protrusions 408 that project outwardly radially from the wavy annular body 402a of the retainer 400. Also, FIG. 18 shows that the retainer 400 may have two planes of symmetry 412. This may not be the case in other embodiments of the present disclosure.

Figure 19:
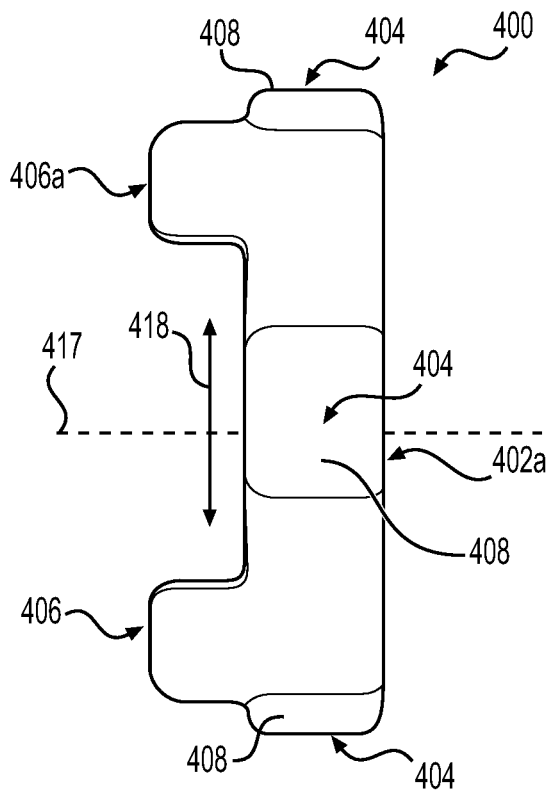
FIG. 19 is a side view of the retainer of FIG. 17.
Figure 20:
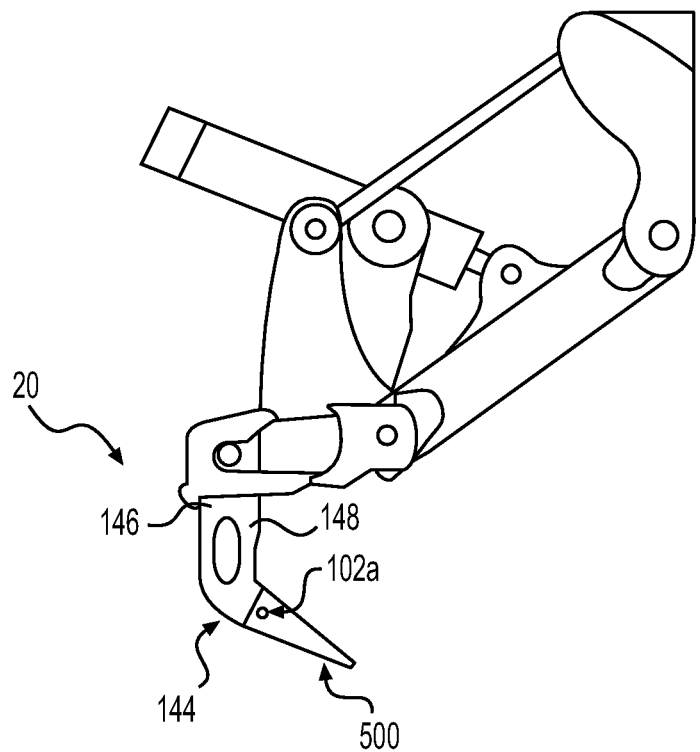
FIG. 20 is an enlarged side view of the ripper assembly of FIG. 1.
Figure 21:
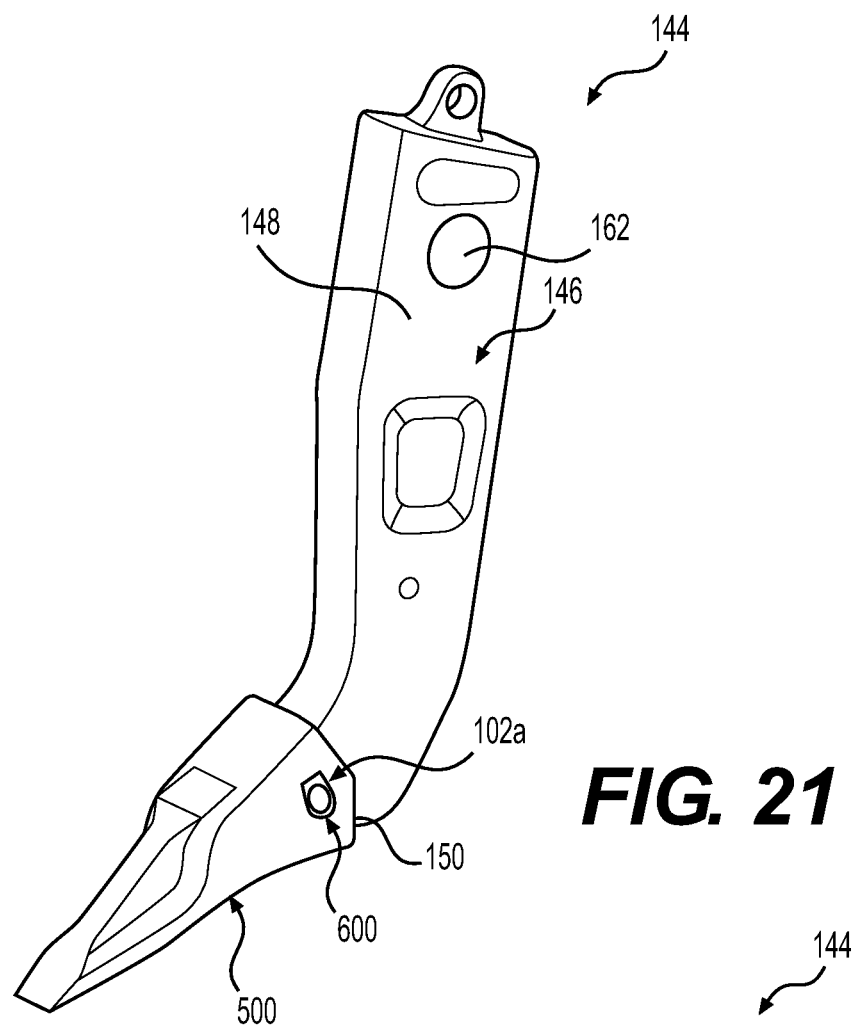
FIG. 21 is a front oriented perspective view of a ripper shank and a ripper tip subassembly that forms a part of the ripper assembly of FIGS. 1 and 20 removed from the machine showing a retaining system (or retaining assembly) according to an embodiment of the present disclosure securing the ripper tip to the ripper shank. The head of a customized pin as well as a pry slot are shown on the right side of the ripper tip.

In FIGS. 17 thru 19, the second tab 406a may be identically configured as the first tab 406, being disposed at a 180 degree interval about the axis of rotation 116 of the lock, and the first and the second tab 406, 406a may be radially aligned with one of the four detent protrusions 408. Moreover, the wavy annular body 402a may include an interior peripheral wall 414 (e.g. a surface) defining a plurality of flex grooves 410, with one of the plurality of grooves 410 being radially aligned with one of the four detent protrusions 408, each of the flex grooves 410 extending axially completely through retainer 400. Other configurations are possible in other embodiments of the present disclosure.

In addition, the wavy annular body defines an enclosed perimeter (i.e. completely closed along a 360 degree interval about the axis of rotation), and the first and second tab(s) define angular extents 416 measured in the circumferential direction that range from 80 degrees to 100 degrees (see FIG. 18).

Figure 13:
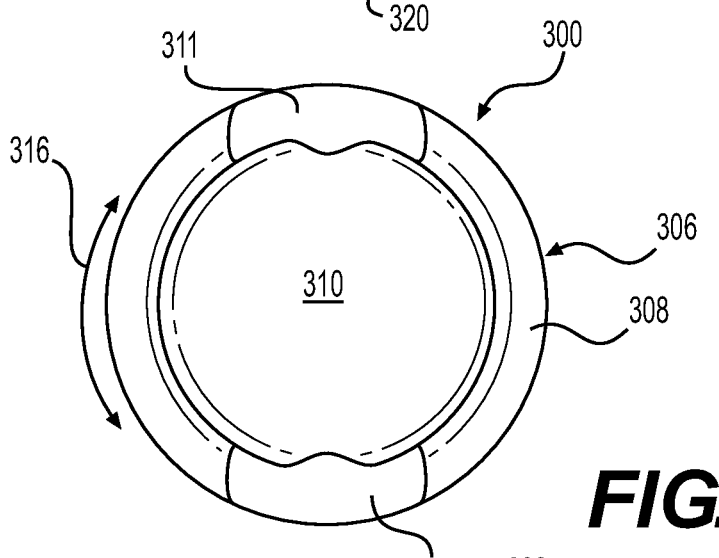
FIG. 13 is a rear view of the lock of FIG. 11. The skirt and the shank receiving apertures of the lock are illustrated.
Figure 14:
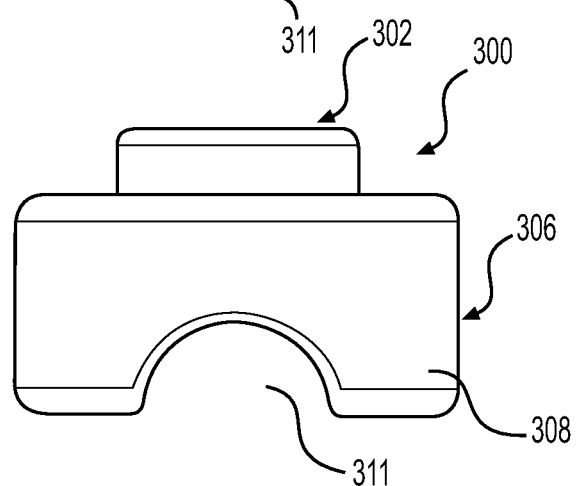
FIG. 14 is a top view of the lock of FIG. 11. The driver portion, the skirt, and the shank receiving apertures are shown.
Figure 15:
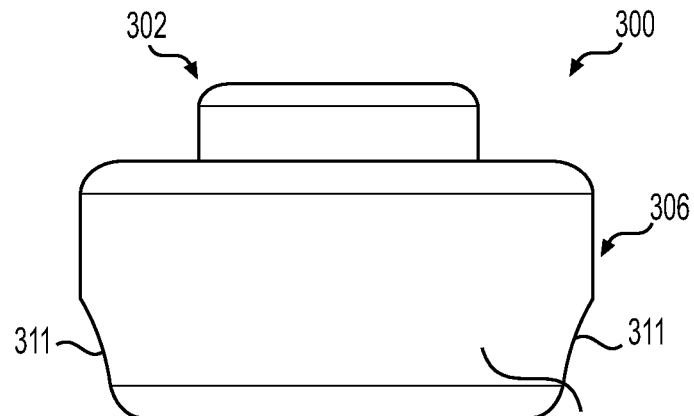
FIG. 15 is a side view of the lock of FIG. 11. The driver portion, the skirt, and the shank receiving apertures are shown.

Looking at FIGS. 12 thru 14, that the at least one shank receiving aperture 311 of the skirt 308 of the lock 300 may include two radially aligned shank receiving apertures 311. These apertures 311 may have a semi-circular shape or similar shape. This may not be the case for other embodiments of the present disclosure. Moreover, the detent receiving apertures 314 of the skirt 308 of the lock 300 may include four detent receiving grooves 315 that are disposed on the interior wall 318 of the skirt 308 that are spaced circumferentially about the axis of rotation 116 at ninety degree intervals. Consequently, the lock 300 may have two planes of symmetry 320 as best seen in FIG. 12.

Figure 16:
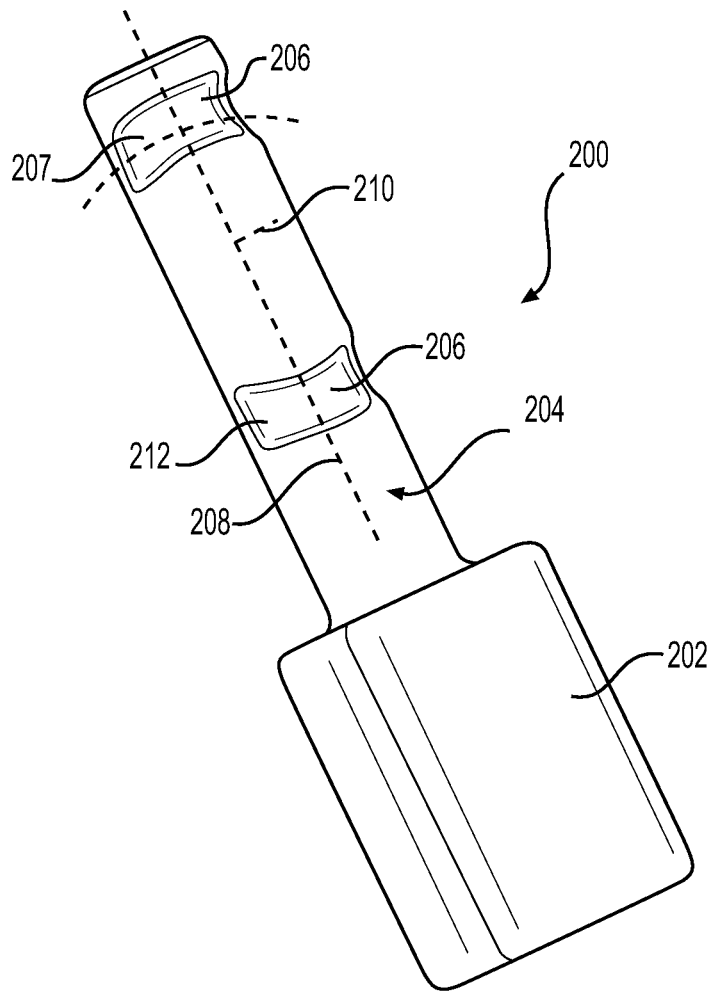
FIG. 16 is a perspective view of the bit employed in FIGS. 5 thru 10 shown in isolation. The skirt receiving slots are clearly shown in the shank portion of the bit.

Now, a replacement part in the form of a work tool or a wear member 200 (e.g. a grading bit) that may be provided will be described with reference to FIG. 16.

The work tool/wear member 200 may comprise a working portion/wear portion 202, and a shank 204 extending from the working portion/wear portion 202, defining a longitudinal axis 208. Also, a first lock receiving groove 207 may be provided that defines an axis of rotation 210 that is perpendicular to the longitudinal axis 208 of the shank 204.

As shown, a generic configuration is illustrated for the working portion/wear portion in the form of a rectangular cubic shape with rounded corners, but it is to be understood that this configuration may be altered to include more intricate shapes or any shape that is suitable for any purpose. Likewise, the shank includes a cylindrical configuration but other shapes are possible including those that have a polygonal cross-section, an elliptical cross-section, etc. As shown, the longitudinal axis 208 takes the form of a cylindrical axis for the embodiment shown in FIG. 16. Also, the shank 204 may further define a second lock receiving groove 212 that shares the same axis of rotation 210 as the first lock receiving groove 207. That is to say, both grooves are formed by rotating a cross-sectional shape about the axis of rotation and removing that material. The cross-sectional shape may be essentially equivalent to that of the skirt of the lock. In such a case, the first lock receiving groove 207 and the second lock receiving groove 212 extend completely through the shank 204 about the axis of rotation 210. This may not the case for other embodiments of the present disclosure.

In some embodiments, the lock may be made for any suitably rigid material including steel, cast iron, white-iron, etc. The lock may be manufactured by casting, forging, and/or machining. Also, the retainer may be made from any suitably resilient material including spring steel, rubber, elastomer, plastic (e.g. polyurethane), etc. When plastic is employed, the retainer may be injection molded, etc.

Any of the aforementioned configurations, and materials may be altered to be different in other embodiments of the present disclosure.

Turning now to FIGS. 20 thru 33, various embodiments of a ripper assembly 20, a ripper shank and ripper tip subassembly 144, as well as the retaining system 102a used to attach the ripper tip 500 to the ripper shank 146 will now be discussed.

Starting with FIGS. 21 thru 28, a ripper shank and ripper tip subassembly 144 for attaching ripper tips 500 to a machine 10 will now be described in detail. The subassembly 144 may comprise a ripper shank 146 including a top ripper assembly attachment portion 148, and a bottom ripper tip retention portion 150. The subassembly 144 may further comprise a lock 300a, a retainer 400, and a pin 600 (that may form the retaining system 102a).

Figure 25:
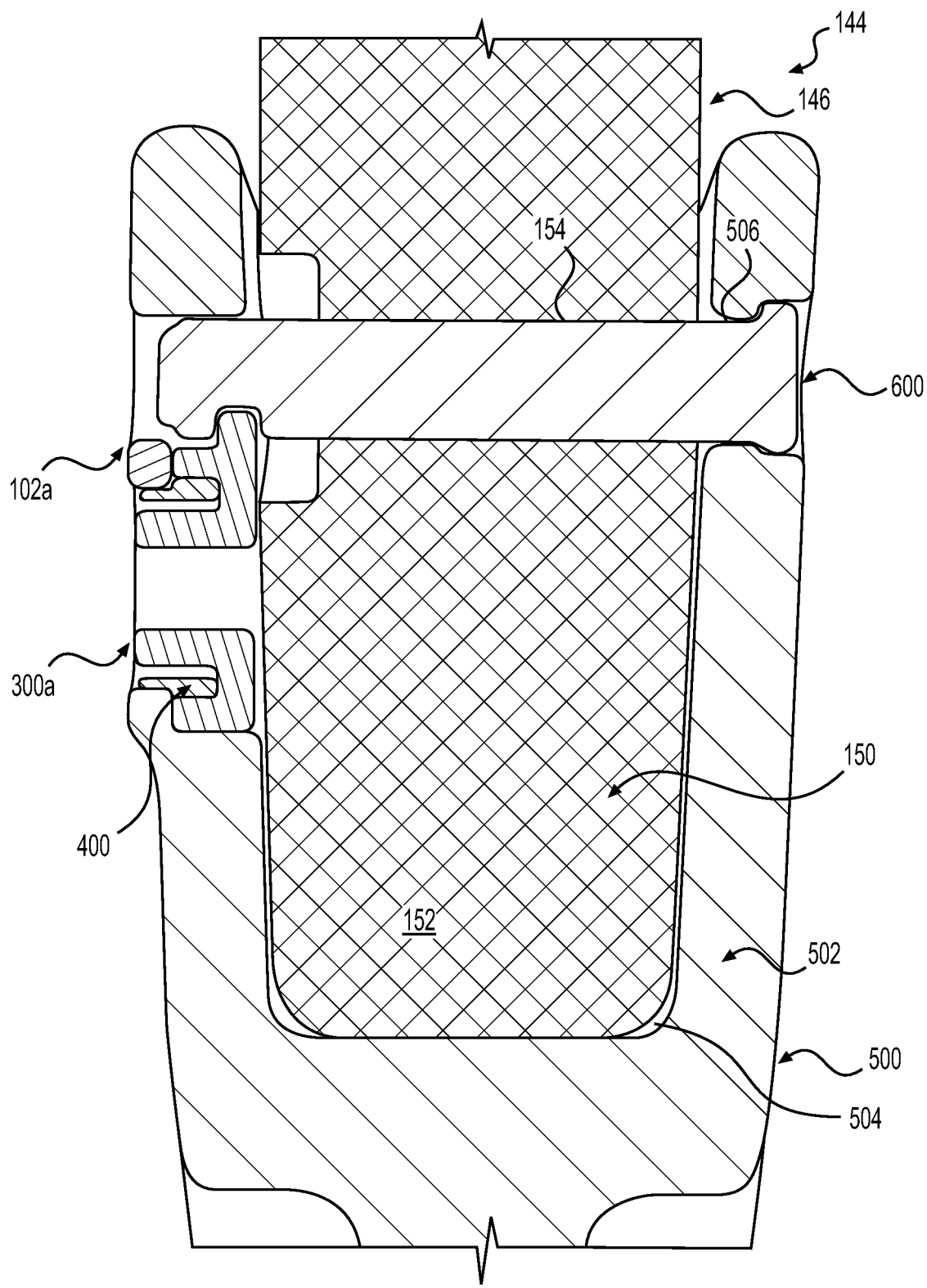
FIG. 25 is a sectional view of the ripper tip and shank of FIG. 24 showing the lock, and the retainer installed in the apertures of the ripper tip as well as the mating of the lock with the pin that is installed in the apertures of the shank.
Figure 27:
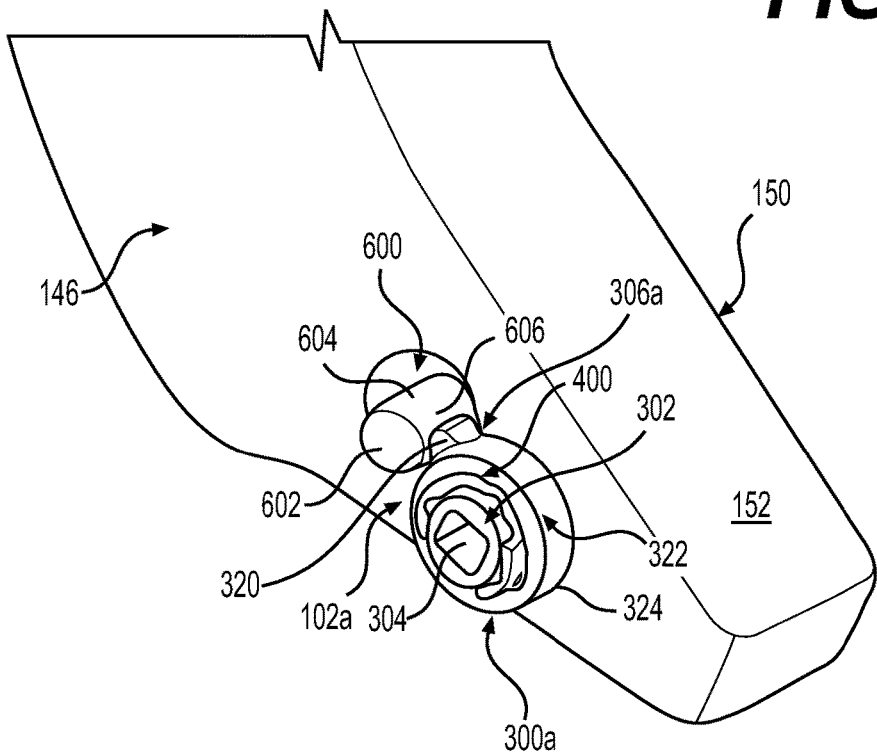
FIG. 27 shows the retaining system and ripper shank of FIG. 23 with the ripper tip removed, revealing the lock of the retaining system in a locked configuration.

As best seen in FIGS. 25 and 27, the bottom ripper tip retention portion 150 may include a nose portion 152 defining an axis of extension 154, and a pin receiving aperture 154 extending completely through nose portion 152. The vertical direction 156 along which top ripper assembly attachment portion 148 generally extends, forms an oblique angle 158 with the bottom ripper tip retention portion. Also, a curved portion 160 may be interposed between portions 148 and 150 (see FIG. 29). As a result, the ripper shank 146 may be characterized as having an "L" or "J" shaped configuration. Other configurations are possible in other embodiments of the present disclosure. Looking at FIGS. 21 and 29, the top ripper assembly attachment portion 148 may define a shaft receiving aperture 162 for attaching the ripper shank and ripper tip subassembly to the ripper assembly 20. Other methods of attachment are possible in other embodiments of the present disclosure.

Figure 26:
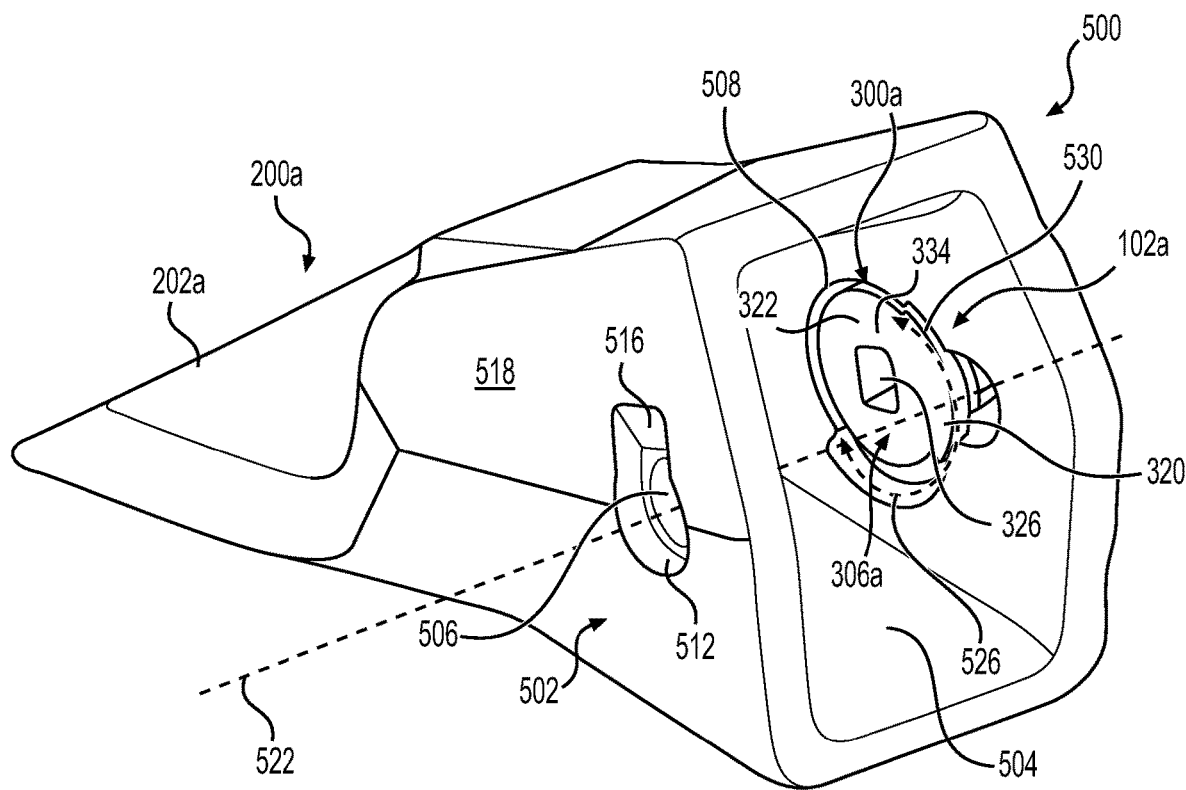
FIG. 26 is a rear oriented perspective view of the ripper tip of FIGS. 21 thru 25 removed from the ripper shank, revealing the interior apertures that hold the lock and well as the apertures that contain the customized pin (which is not shown for enhanced clarity).

In FIGS. 25 and 26, the ripper tip 500 may including a hollow portion 502 defining a nose portion receiving cavity 504, a pin receiving thru-hole 506 that extends completely through the hollow portion 502, and that is in communication with the nose portion receiving cavity 504. In FIG. 25, the ripper tip 500 is disposed on the nose portion 152 of the bottom ripper tip retention portion 150 of the ripper shank 146, and the pin 600 is disposed in the pin receiving thru-hole 506 of the hollow portion 502 of the ripper tip 500, as well as the pin receiving aperture 154 of the bottom ripper tip retention portion 150 of the ripper shank 146.

In FIG. 27, the pin 600 defines a free end 602, and includes a peripheral surface 604 that defines a notch 606 that is disposed adjacent to the free end 602. The peripheral surface 604 may have any suitable shape including a surface of revolution (e.g. a cylindrical surface, a conical surface), or a faceted surface (such as a when the pin includes a shaft with a polygonal cross-section). In addition, the lock 300a may include a drive portion 302, and a locking portion 306a that includes a wing 320 that is configured to fit within the notch 606, locking the pin 600 and the ripper tip 500 onto the ripper shank 146.

With continued reference to FIG. 27, the drive portion 302 defines a drive recess 304, whereas the locking portion 306a comprises an annular wall 322 including an outer peripheral surface 324. As best seen in FIG. 26, the locking portion 306a is cored out by core-out aperture 326 having a rectangular shape, forming the annular wall 322. This aperture 326 may be differently configured in other embodiments of the present disclosure or may be omitted altogether in other embodiments of the present disclosure, forming a plain wall. For the embodiments shown, the core-out aperture and the drive recess are one in the same feature. This may not be the case in other embodiments of the present disclosure. In FIGS. 26 and 27, it can be understood that the wing 320 projects from the outer peripheral surface 324.

Looking at FIG. 31, the lock 300a further comprises a rib 328 that extends along the axis of rotation from the annular wall 322 toward the drive portion 302, defining an annular cavity 312 between the drive portion 302 and the rib 328 that is configured to receive the retainer 400, and at least one detent receiving aperture 314 may be disposed in the annular cavity 312.

Figure 24:
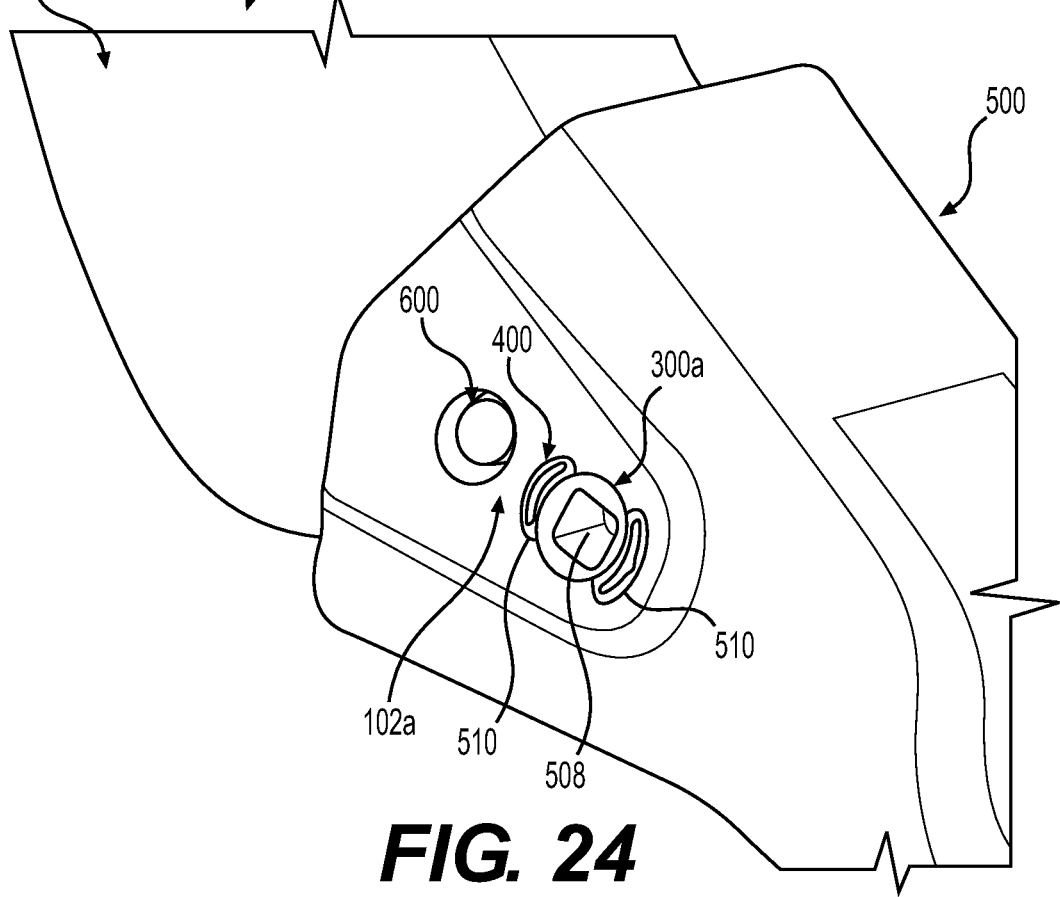
FIG. 24 is an enlarged detail view of the retaining system of FIG. 23, showing, the free end of the customized pin, the retainer, and the lock more clearly.
Figure 28:
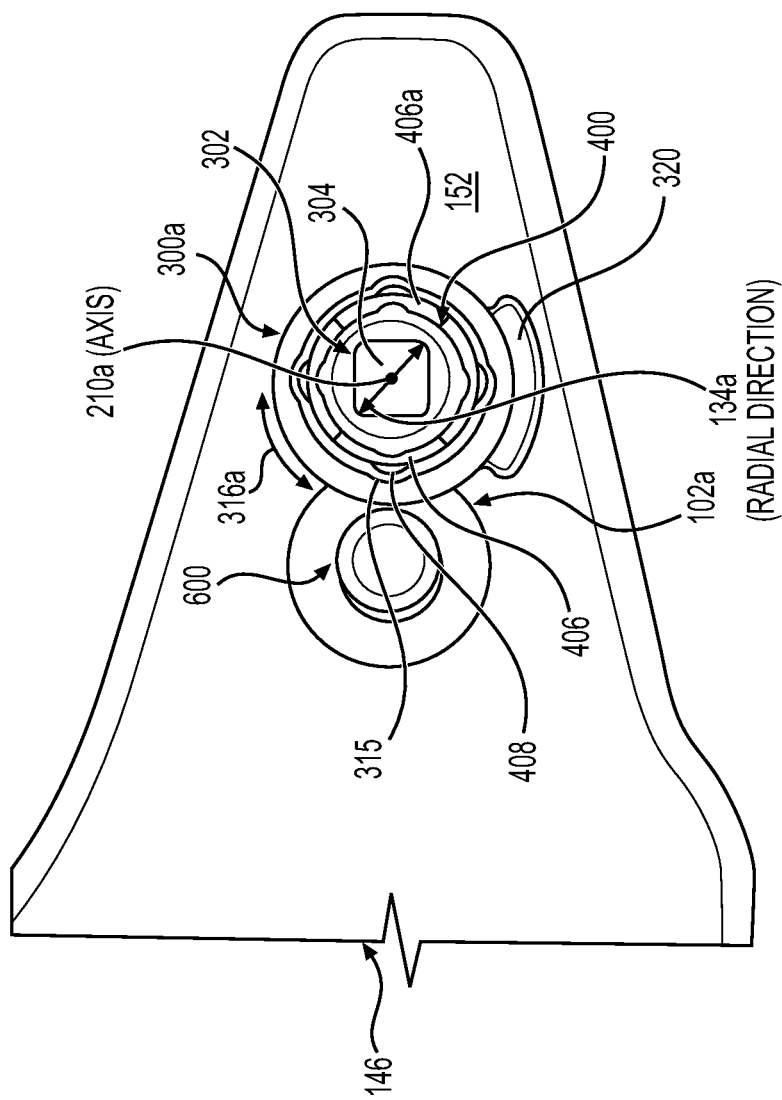
FIG. 28 is a side oriented perspective view of the retaining system of FIG. 27 with the lock shown in an unlocked configuration.
Figure 32:
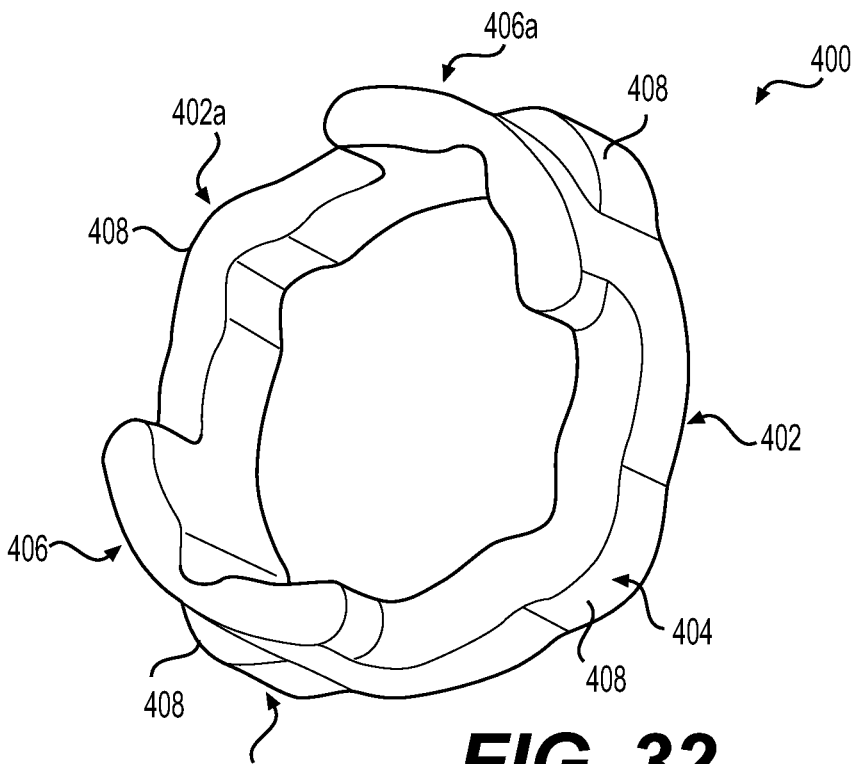
FIG. 32 is a perspective view of the retainer of FIGS. 23 thru 28 shown in isolation. This embodiment of a retainer may be similarly or identically configured as the embodiment shown in FIG. 17 but not necessarily so.

Focusing on FIGS. 28 and 32, the retainer 400 may be disposed in the annular cavity 312, and the retainer 400 may include an undulating ring portion 402 comprising at least one detent 404 that is configured to engage the at least one detent receiving aperture 314 of the lock 300a. Referring to FIGS. 24 and 32, one or more tabs 406, 406a (e.g. two tabs may be radially aligned) that extend axially from the undulating ring portion 402, and that is disposed in the slot 510 that is radially offset from the lock receiving aperture 508 of the tip.

Figure 22:
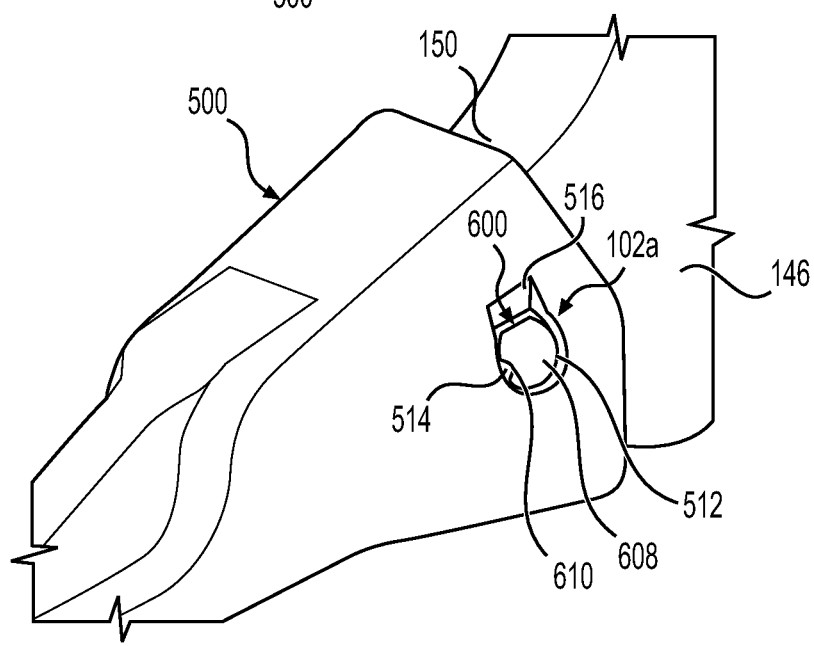
FIG. 22 is an enlarged detail view of the retaining system of FIG. 21, showing the pry slot, and customized pin with anti-rotation/orientation features shown more clearly.
Figure 23:
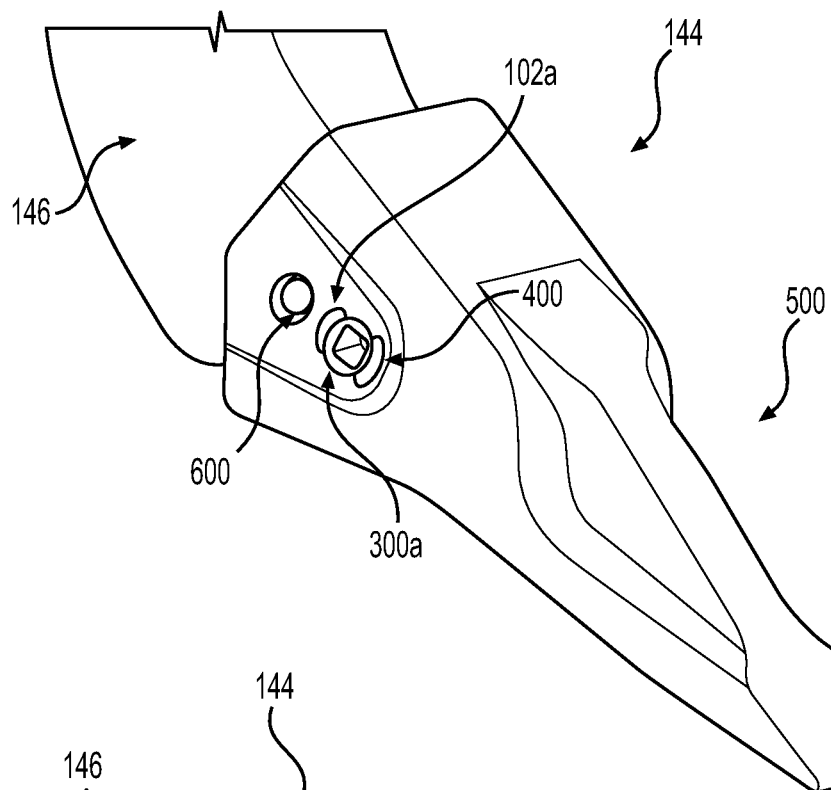
FIG. 23 is an alternate front oriented perspective view of the ripper shank and ripper tip subassembly of FIG. 21 showing the left side of the ripper tip, as well as the free end of the customized pin, the retainer, and the lock of the retaining system.
Figure 33:
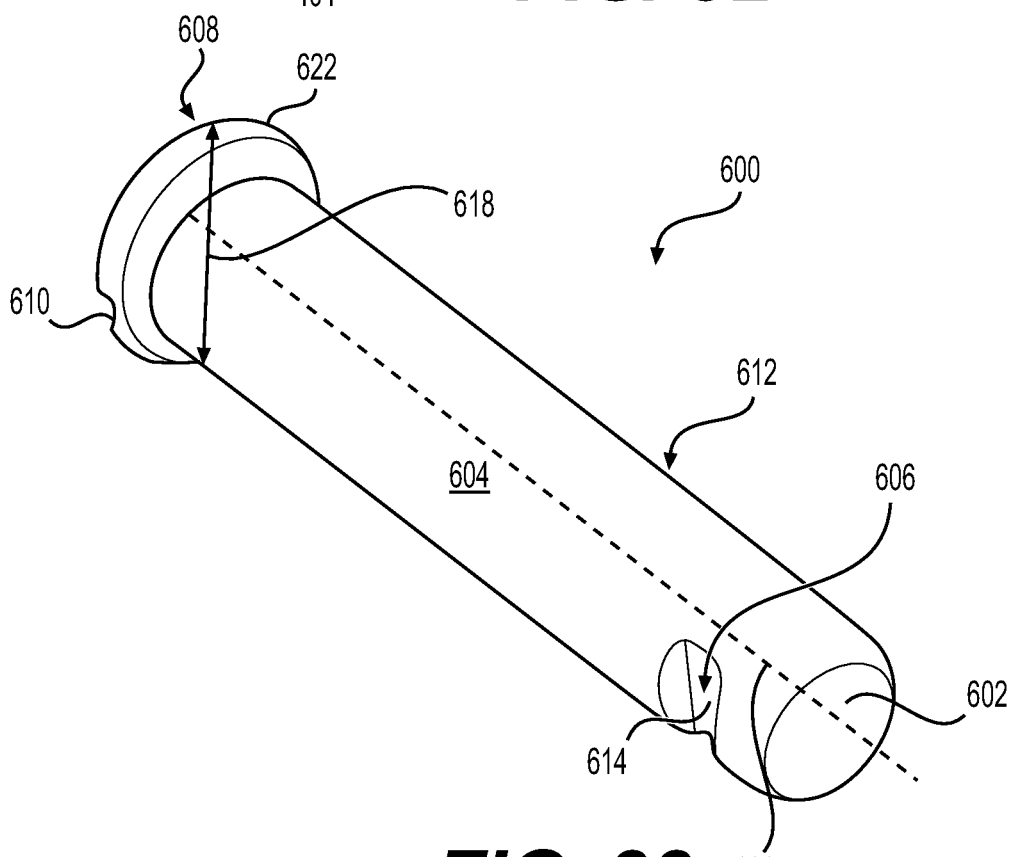
FIG. 33 is a perspective view of the pin of FIGS. 23 thru 28 shown in isolation.

Looking now at FIGS. 22 and 33, the pin 600 may have a head 608 defining an indentation 610. The ripper tip 500 may include a head receiving recess 512 (e.g. a counterbore) that is in communication with the pin receiving thru-hole 406. The head 608 of the pin 600 may disposed in the head receiving recess 512, and the ripper tip 500 further includes a protrusion 514 that is disposed in the indentation 610, helping to ensure the proper alignment of the notch 606 of the pin 600 with the wing 320 of the lock 300a so the wing may enter or exit the notch. The ripper tip 500 may further include a ramped pry slot 516 that is in communication with the head receiving recess 512 to aid in the removal of the pin. This feature may be omitted. In such a case, the pin could be hammered out the other side on the free end of the pin.

Next, a retaining system 102a that may be provided as replacement kit or a repair kit will be discussed with reference to FIGS. 26 thru 28, and 31 thru 33. The retaining system 102a may comprise a lock 300a including a drive portion 302, and defining an axis of rotation 210a, a radial direction 134a, and a circumferential direction 316a (see FIG. 28). The lock 300a may also include a locking portion 306a including an outer peripheral surface 324, and a wing 320 that extends radially outwardly from the outer peripheral surface 324 (see FIG. 31). The locking portion 306a may be connected to the drive portion 302 by an annular wall 322. The lock 300a may further comprise a rib 328 extending axially from the annular wall 322 toward the drive portion forming an annular cavity 312, defining at least one detent receiving aperture 314 that is disposed in the annular cavity 312. A retainer 400 may be provided that is configured to fit within the annular cavity 312 (see FIG. 28).

In FIG. 31, the rib 328 may include an interior wall 318 facing radially inwardly toward the drive portion 302 of the lock 300a, and the at least one detent receiving aperture 314 may be disposed on the interior wall 318 of the rib 328. An opposite arrangement may be provided in other embodiments of the present disclosure.

The wing 320 may extend circumferentially an angular extent 330 ranging from 70 degrees to less than 90 degrees. Other configurations and angular dimensions may be used in other embodiments of the present disclosure.

The drive portion 302 may define a drive recess 304 having a rectangular configuration. Other configurations of the drive portion 302 are possible for other embodiments of the present disclosure as discussed earlier herein.

The retainer 400 may be disposed in the annular cavity 312, and may have a wavy annular body 402a having at least one detent 404 that is configured to mate with the at least one detent receiving aperture 314 of the lock 300a (see FIG. 32). One or more tabs 406, 406a may extend axially away from the wavy annular body 402a, and may be disposed radially adjacent to the drive portion 302 of the lock 300a (see FIG. 28).

Looking at FIGS. 26 and 31, the drive portion 302 may define a first axial end 332 of the lock 300a, while the locking portion 306a may define a second axial end 334. The wing 320 may be disposed at the second axial end 334 in some embodiments of the present disclosure.

As best understood with reference to FIGS. 28 and 31, the at least one detent receiving aperture 314 of the rib 328 of the lock 300a may include four detent receiving grooves 315 that are disposed on the interior wall 318 of the rib 328 that are spaced circumferentially about the axis of rotation 310a at ninety degree intervals, and the at least one detent 404 of the retainer 400 may include four detent protrusions 408 that project outwardly radially from the wavy annular body 402a of the retainer 400. Other arrangements are possible in other embodiments of the present disclosure.

Now a replacement part such as a work tool or a wear member (e.g. a ripper tip 500) will be described with reference to FIGS. 26 and 30.

The work tool/wear member 200a may comprise a working portion/wear portion 202a, and a hollow portion 502 defining an exterior 518, and a nose portion receiving cavity 504 with a direction of assembly 520, a pin receiving thru-hole 506 that is disposed along the direction of assembly 520, and that extends completely through the hollow portion 502 along a direction 522 that is transverse (i.e. non-parallel such as perpendicular or nearly perpendicular) to the direction of assembly 520, and that is in communication with the nose portion receiving cavity 504.

The hollow portion 502 may further define a lock receiving aperture 508, defining an axis of rotation, a radial direction, and a circumferential direction (as previously described and may be the same as those of the lock 300a), and the axis of rotation 210a is transverse to the direction of assembly 520. The axis of rotation 210a may be spaced away from the direction 522 the pin receiving thru-hole 506 extends a predetermined distance 524 measured along the direction of assembly 520 (i.e. 210a and 522 are not collinear, see also FIG. 25).

The hollow portion 502 may further define a wing receiving slot 526 that is disposed in the nose portion receiving cavity 504, and that extends circumferentially and radially from the lock receiving aperture 508. A retainer receiving cavity 528 including a tab receiving slot 510 may be disposed on the exterior 518, and may extend radially and circumferentially from the lock receiving aperture 508.

The wing receiving slot 526 may define an angular extent 530 that is 180 degrees or greater, and the exterior 518 may further define a head receiving recess 512 that is in communication with the pin receiving thru-hole 506, and a ramped pry slot 516 that is in communication with the head receiving recess 512.

In some embodiments, the lock or any work member/wear member may be made for any suitably rigid material including steel, cast iron, white-iron, etc. The lock may be manufactured by casting, forging, and/or machining. Also, the retainer may be made from any suitably resilient material including spring steel, rubber, elastomer, plastic (e.g. polyurethane), etc. When plastic is employed, the retainer may be injection molded, etc.

Any of the aforementioned configurations, dimensions, and materials may be altered to be different in other embodiments of the present disclosure.

As mentioned earlier herein, various machines in addition to a motor grader may use retaining systems according to various embodiments of the present disclosure. For example, FIG. 34 discloses such a machine in the form of a bulldozer.

Figure 34:
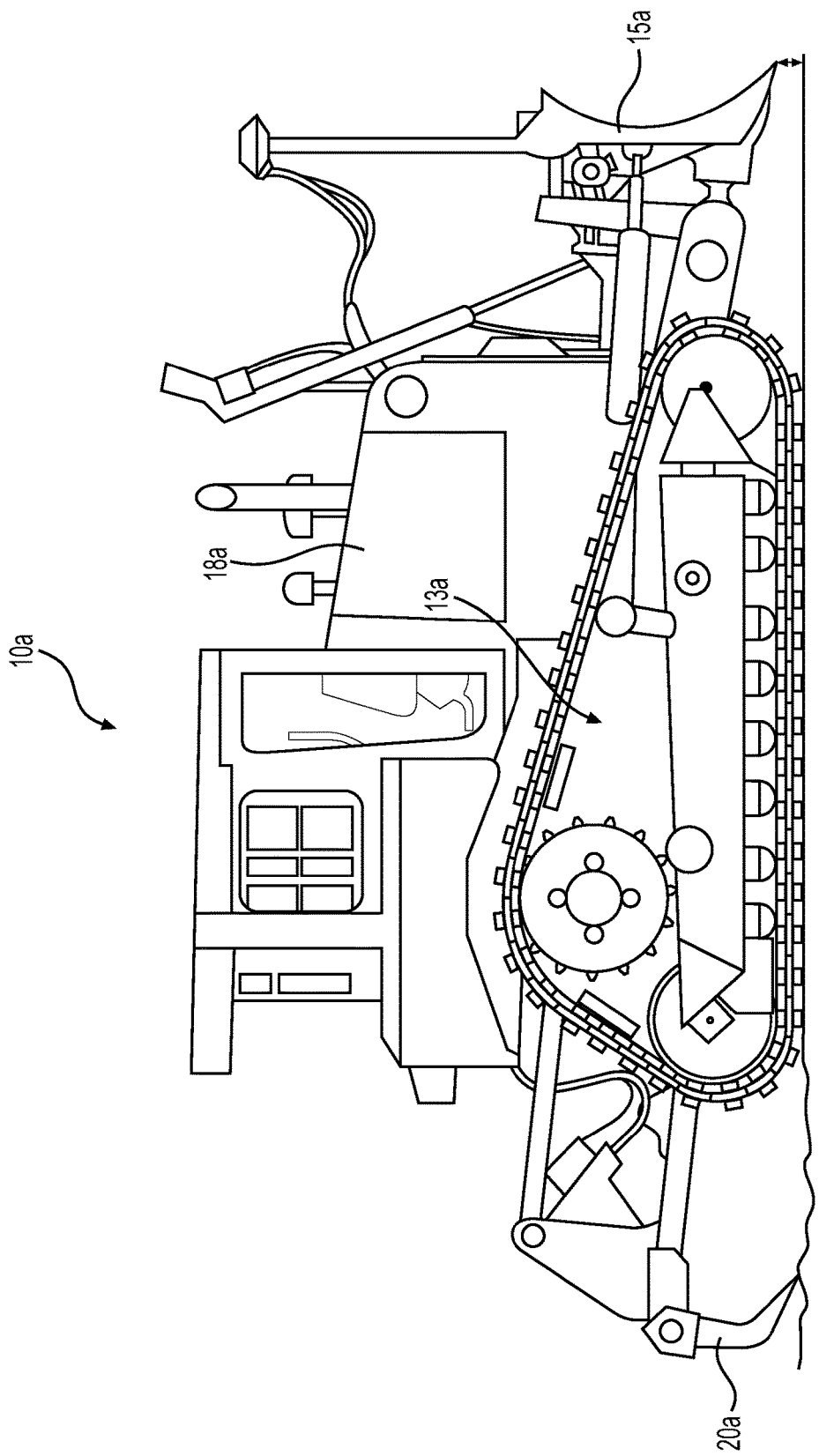
FIG. 34 is a side view of a bulldozer that may employ a retaining system according to an embodiment of the present disclosure for attaching a work tool or a wear member such as a ripper tip to a ripper shank or a cutting edge to a blade, forming a ripper assembly or a blade assembly that is attached to the machine.

As can be seen in FIG. 34, the machine 10a may be powered by a power source 18a (e.g. an engine), moved by a tracked undercarriage 13a, and include a work implement such as blade assembly 15a that may have working edges attached to it in a manner similar to what has been described in FIGS. 3 thru 19, and/or a ripper assembly 20a that may have ripper tips attached to it in a manner similar to what has been described herein with reference to FIGS. 20 thru 33. Other industrial applications are further contemplated herein.

Now, a blade assembly having a retention system for attaching cutting edges to a machine such as shown in FIG. 34 will be described with reference to FIGS. 35 thru 42.

Figure 40:
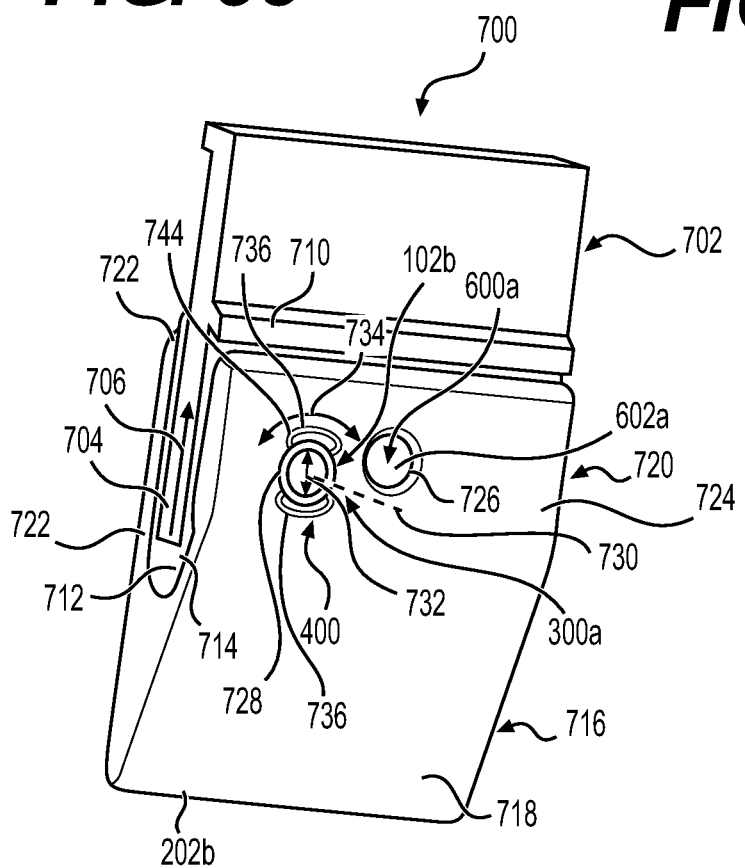
FIG. 40 is a rear oriented perspective view of the assembly of FIG. 39 with the lock, and retainer installed. The lock has been rotated into the locked configuration.

In FIG. 40, the blade assembly 700 may comprise a blade portion 702, a lock 300a, a retainer 400, and a pin 600a. The lock, the retainer, and the pin may be constructed as previously described herein or may have some modifications.

The blade portion 702 may include a lip 704 defining a direction of assembly 706, and a pin receiving aperture 708 extending completely through lip along a direction that is transverse (i.e. not parallel, e.g. perpendicular or nearly perpendicular) to the direction of assembly 706. The blade portion 702 may further include a support rib 710 that is configured to support the cutting edge along the direction of assembly 706, providing a space 712 in the lip receiving slot 714 of the cutting edge 716.

The cutting edge 716 may include a working portion 718 and an attachment portion 720 that has a front leg 722, and a rear leg 724 that are spaced away from each other, forming the lip receiving slot 714 therebetween. A pin receiving thru-hole 726 may extend completely through the attachment portion 720, and that is in communication with the lip receiving slot 714. The cutting edge 716 may be disposed on the lip 704 of the blade portion 702, while the pin 600a may be disposed in the pin receiving thru-hole 726 of the attachment portion 720 of the cutting edge 716, and the pin receiving aperture 708 of the lip 704 of the blade portion 702 (see FIG. 41).

Turning to FIGS. 36, 37, and 40, it can be understood that the pin 600a defines a free end 602a, and includes a peripheral surface 604a that defines a notch 606. Also, the cutting edge 716 includes a lock receiving aperture 728 (may be similarly or identically configured as the lock receiving aperture of FIGS. 25 and 26) in the attachment portion 720 that defines an axis of rotation 730, a radial direction 732, and a circumferential direction 734.

As best understood with reference to FIG. 31, the lock 300a includes a drive portion 302, and a locking portion 306a that includes a wing 320 that is configured to fit within the notch 606. To that end, the notch and the wing may have matching concave and convex arcuate surfaces to allow the wing to move within the notch as the lock is rotated.

Figure 41:
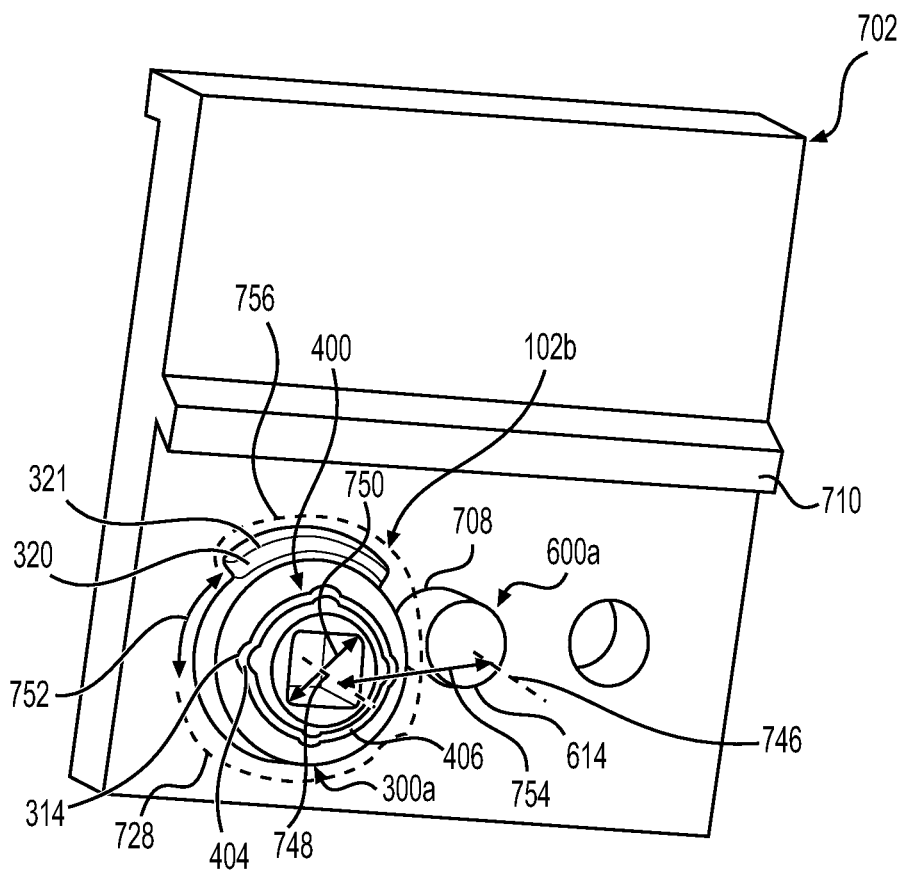
FIG. 41 shows the assembly of FIG. 40 with the cutting edge removed, revealing the lock rotated into an unlocked configuration.

Referring back to FIG. 40, it can be seen that the cutting edge 716 further includes a slot 736 that is radially offset from the lock receiving aperture 728, and the retainer 400 is disposed in the annular cavity 312 (see FIG. 41).

In FIG. 32, the retainer 400 includes an undulating ring portion 402 comprising at least one detent 404 that is configured to engage the at least one detent receiving aperture 314 of the lock 300a (se FIG. 41), and a tab 406 that extends axially from the undulating ring portion 402, and that is disposed in the slot 736 (see FIG. 40) that is radially offset from the lock receiving aperture 728.

Figures 38, 39:
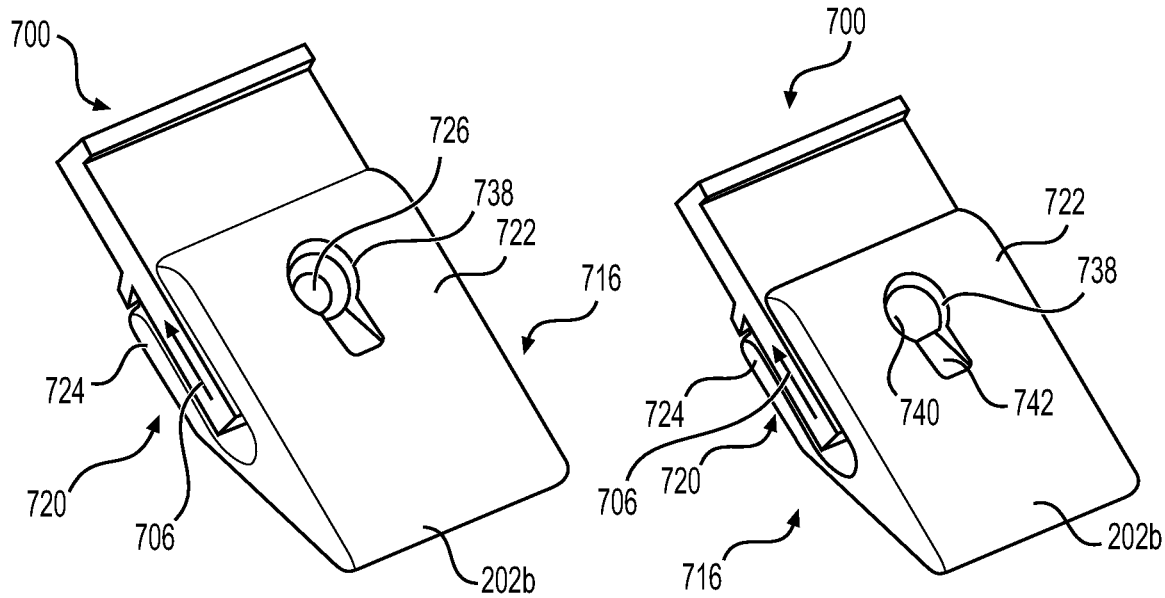
FIG. 38 shows the cutting edge of FIG. 36 inserted onto a portion of a blade before the pin has been inserted.
FIG. 39 shows the cutting edge of FIG. 38 being retained onto a portion of a blade by the pin after the pin has been inserted.

Looking at FIGS. 37 and 39 together, the pin 600a may include a head 608a defining an indentation 610a. The cutting edge 716 may include a head receiving recess 738 that is in communication with the pin receiving thru-hole 726 (see also FIG. 38). As seen in FIG. 39, the head 608a may be disposed in the head receiving recess 738, and the cutting edge 716 may further include a protrusion 740 that engages the indentation 610a. The cutting edge 716 may further include a ramped pry slot 742 that is in communication with the head receiving recess 738 (but not necessarily so).

A retaining system 102b that is similarly or identically configured as that of FIGS. 26 thru 28, and 31 thru 34 may also be provided for and used with the blade assembly 700 as a replace part or kit, etc. This retaining system 102b may further comprising a pin 600a including a shaft 612a defining a notch 606 that is configured to receive the wing 320 of the lock 300a (see FIGS. 37 and 41). To that end, the notch 606 may have a concave arcuate surface 614 on its circumference that is able to match (with some slight clearance) and receive a convex arcuate surface 321 on the circumference of the wing 320, allowing the lock 300a to rotate until the wing 320 fully extends through the notch 606 (similar to what is shown in FIG. 27).

Next, a work tool or a wear member (such as a cutting edge 716, a shroud, etc.) that may be provided or used as a replacement part will now be discussed with reference to FIGS. 36, 38 thru 40, and 42. The cutting edge 716 may include a working portion/wear portion 202b, and an attachment portion 720 including a front leg 722, a rear leg 724, and defining a lip receiving slot 714 therebetween, and a direction of assembly 706.

Either the front leg 722 or the rear leg 724 may define a pin receiving thru-hole 726, a retainer receiving cavity 744, and a lock receiving aperture 728. The pin receiving thru-hole 726 may define a longitudinal axis 746, and the lock receiving aperture 728 may define an axis of rotation 748, a radial direction 750, and a circumferential direction 752 (see FIG. 41). The axis of rotation 748 is spaced away from the longitudinal axis 746 a predetermined dimension 754 measured along a direction that is perpendicular to the longitudinal axis 746 (i.e. there is no overlap between the pin receiving thru hole and the lock receiving aperture).

Figure 42:
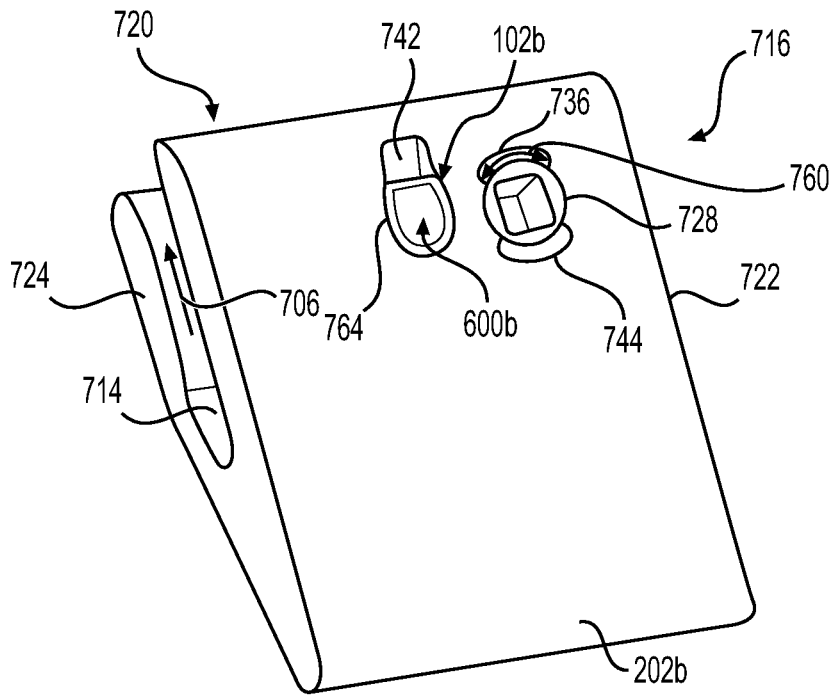
FIG. 42 is an alternate embodiment of the cutting edge of FIG. 36 with the retainer, and the lock disposed on the front surface instead of the rear surface.

As shown by the dotted lines in FIG. 41 and understood by looking at FIG. 26 due to the similar or identical construction, the attachment portion 720 may further define a wing receiving slot 756 that is in communication with the lock receiving aperture 728, and that extends circumferentially and radially from the lock receiving aperture 728. In FIG. 42, the retainer receiving cavity 744 may include a tab receiving slot 736 that extends radially and circumferentially from the lock receiving aperture 728. The tab receiving slot 736 may define an angular extent 760 circumferentially that ranges from 80 degrees to 100 degrees (e.g. about 90 degrees). Other configurations and dimensions are possible in other embodiments of the present disclosure.

Similarly, the wing receiving slot 756 may also define an angular extent (similar or identical to angular extent 526 shown in FIG. 26) circumferentially that is 180 degrees or greater (e.g. must at least be greater than the angular extent of the wing). FIG. 42, shows a head receiving recess 764 that is in communication with the pin receiving thru-hole 726 (see also FIG. 38) and an exterior of the cutting edge 716, as well as a ramped pry slot 742 that is in communication with the head receiving recess 764 on the exterior may also be provided.

As shown in FIG. 42, the head receiving recess 764, the ramped pry slot 742, and the tab receiving slot 736 may be disposed on the front leg 722 of the attachment portion 720 of the cutting edge 716, but not necessarily so.

An alternate embodiment of a blade assembly 700a that may use a retention system for attaching cutting edges to a machine will now be discussed looking at FIGS. 43 thru 49.

Figure 46:
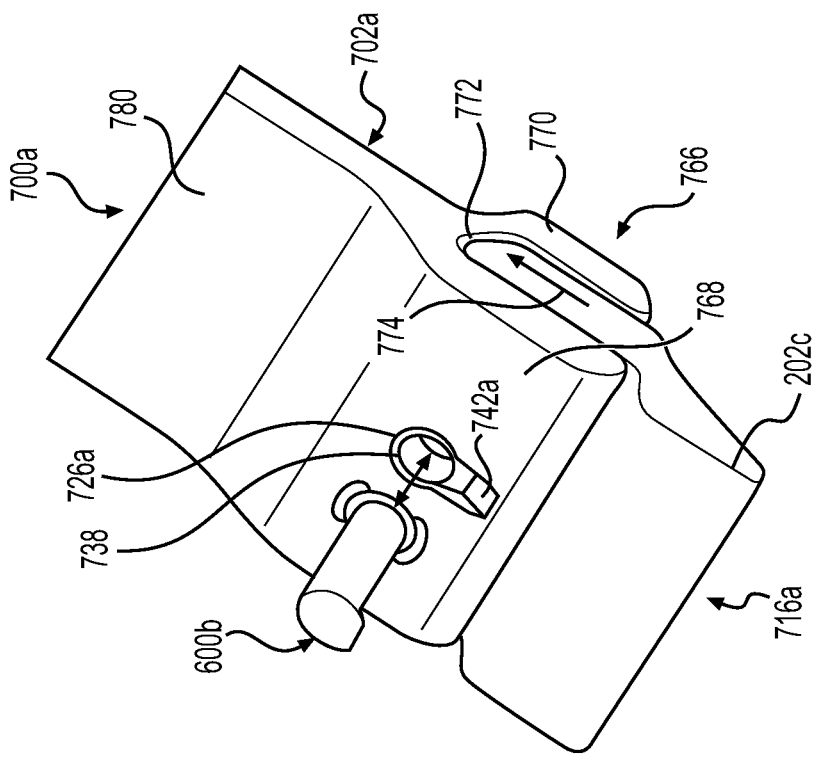
FIG. 46 depicts the pin of FIG. 44 being inserted to hold the cutting edge to the bottom forked section of the blade portion of FIG. 45.
Figure 47:
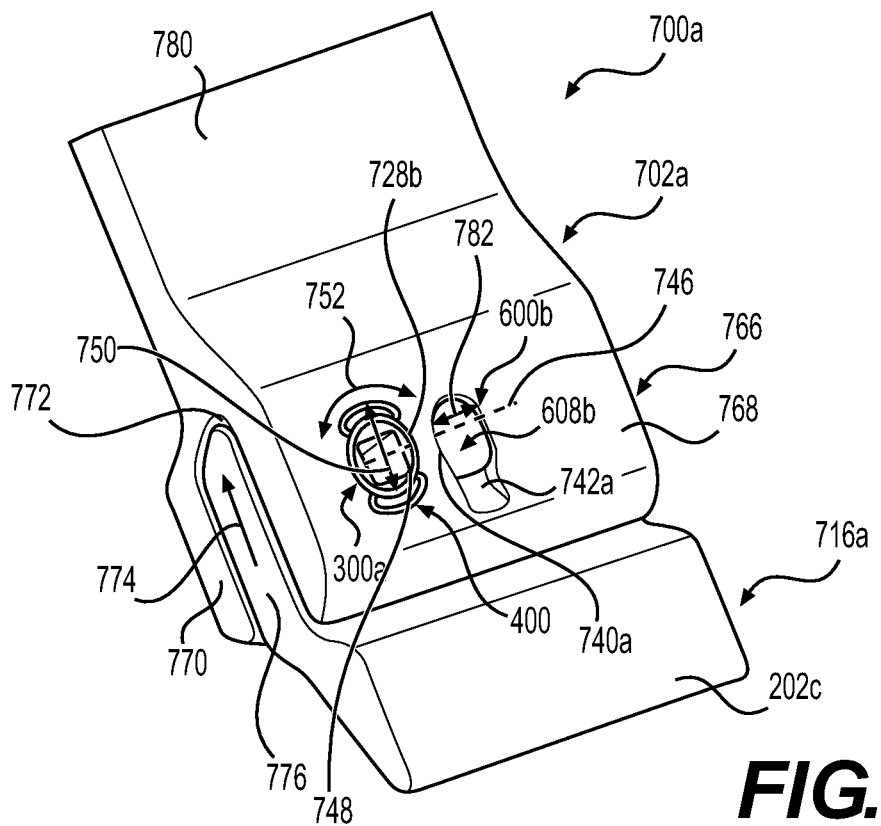
FIG. 47 shows the lock of FIG. 46 being rotated into the locked configuration.
Figure 48:
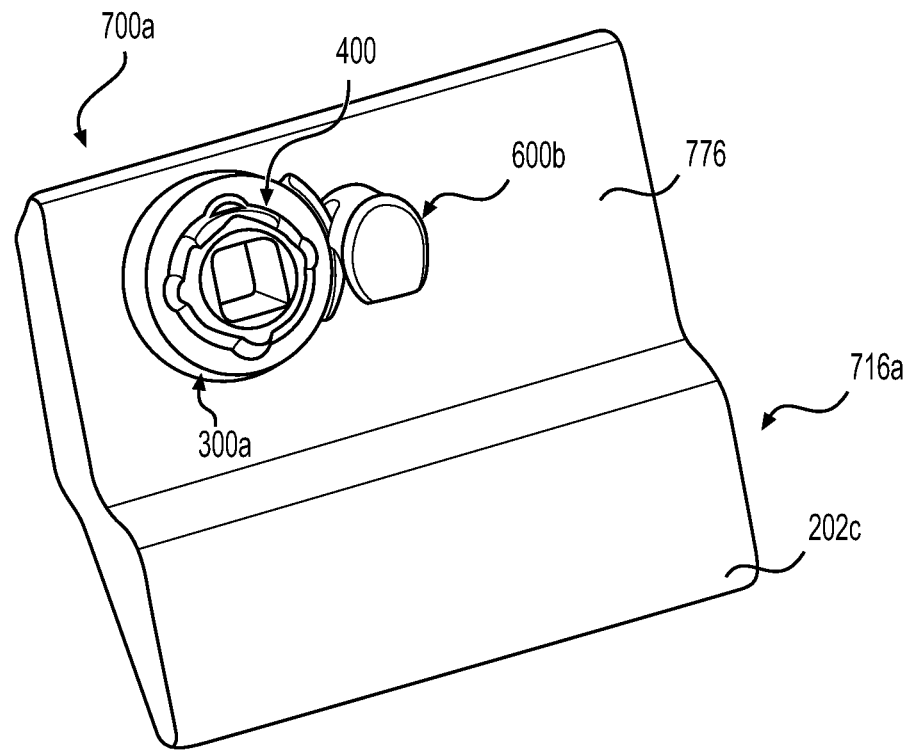
FIG. 48 shows the assembly of FIG. 47 with the blade portion removed, revealing the wing of the lock positioned in the notch of the pin.
Figure 49:
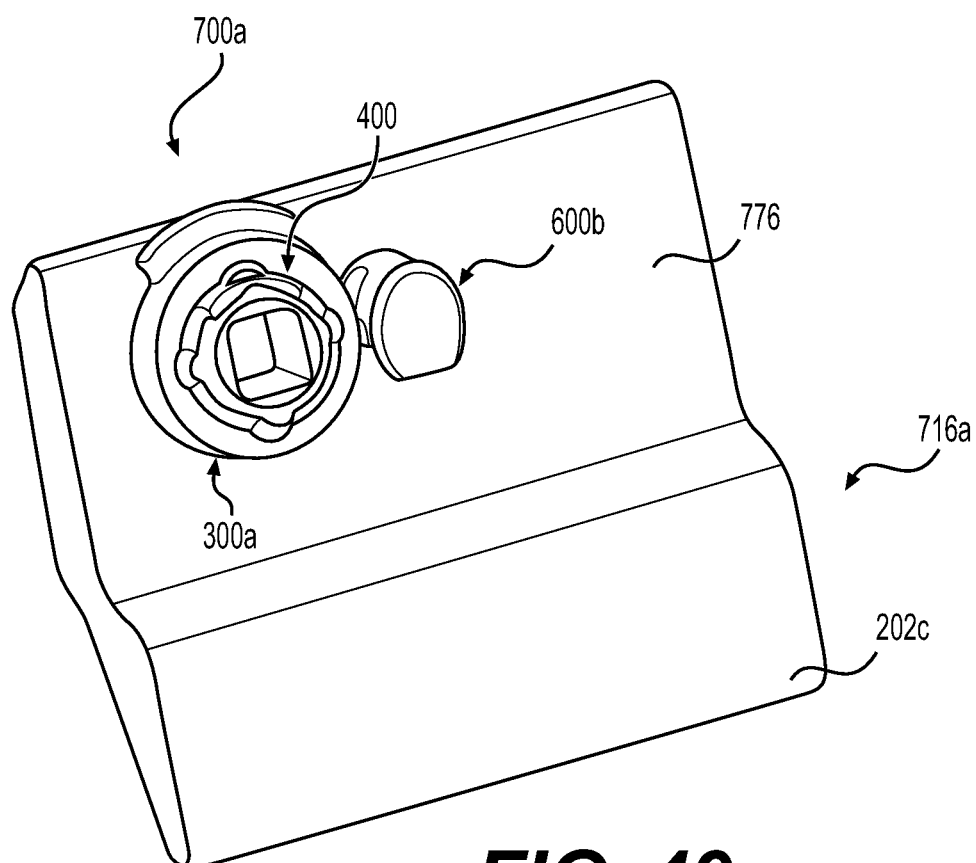
FIG. 49 shows the assembly of FIG. 48 with the lock rotated into an unlocked configuration such that the wing of the lock is no longer in the notch of the pin.

Starting with FIGS. 46 and 47, the blade assembly 700a may comprise a blade portion 702a, a lock 300a, a retainer 400, and a pin 600b.

The blade portion 702a may include a bottom forked section 766 including a front prong 768, a rear prong 770, and defining a cutting edge receiving slot 772 therebetween. This slot defines a direction of assembly 774. A pin receiving thru-hole 726a, and a lock receiving aperture 728b are also provided. The pin receiving thru-hole 726a extends completely through the bottom forked section 726 in a direction that is transverse (i.e. not parallel, e.g. perpendicular or nearly perpendicular) to the direction of assembly 774. The blade portion 702a may further include an upper straight section 780 that extends upwardly from the bottom forked section 766. The body of the cutting edge 716a may jog to form a "Z" shape or a "S" shape (see also FIG. 43), but not necessarily so (e.g. may be straight).

Figure 43:
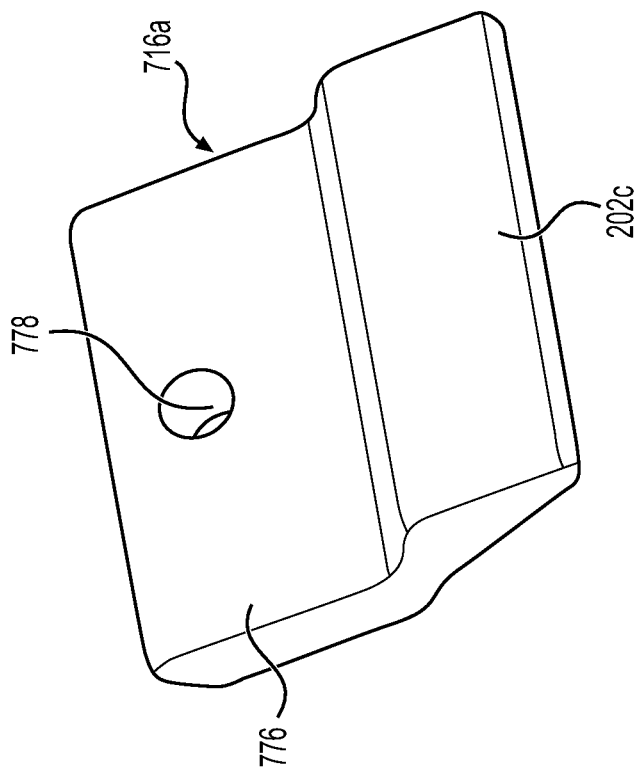
FIG. 43 is a front oriented perspective view of a cutting edge configured according to another embodiment of the present disclosure with a pin receiving hole.

Moreover as best seen in FIG. 43, a cutting edge 716a including a working portion 202c, and an attachment portion 776 defining a pin receiving aperture 778 that is configured to be aligned with the pin receiving thru-hole 726a of the blade portion 702a. The pin 600b may be disposed in the pin receiving thru-hole 726a, and the pin receiving aperture 778 as represented by FIGS. 46 and 47.

Figure 44:
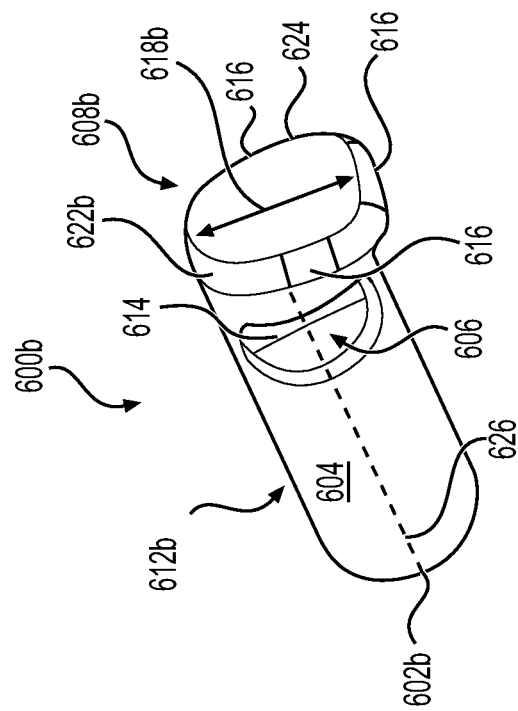
FIG. 44 is a perspective view of yet another embodiment of a customized pin where the head includes orientation flats, and the shaft includes a notch disposed on the peripheral surface of the shaft near the head.

Focusing on FIG. 44, the pin 600b defines a free end 602b, and includes a peripheral surface 604 that defines a notch 606 as previously described herein. The pin 600b includes a head 608b defining a flat 616, and the bottom forked section 766 includes a head receiving recess 738 (see FIG. 45) that is in communication with the pin receiving thru-hole 726a. In FIG. 47, the head 608b is disposed in the head receiving recess 738a, and the bottom forked section 766 further includes a matching flat 740a that engages the flat 616. The bottom forked section 766 further includes a ramped pry slot 742a that is in communication with the head receiving recess 738a.

Looking back at FIGS. 17 thru 19, a retainer that may be provided separately as a replacement part, etc. will now be discussed in the detail.

The retainer 400 may include a wavy annular body 402a defining a central axis 417 (e.g. a conical axis, a cylindrical axis, etc.), and including at least one detent 404, and a tab 406 that extends axially away from the wavy annular body 402a.

In addition, the wavy annular body 402a may define an enclosed perimeter (i.e. a 360 degree perimeter about the central axis 417), a radial direction 418, and a circumferential direction 420. The body 402a may also have a consistent radial thickness 422 (i.e. +/−10% variance from a nominal thickness), and the tab 406 may define an angular extent 416 circumferentially that is less than 180 degrees. In particular embodiments, this angular extend 416 may range from 80 degrees to 100 degrees. Other dimensional values are possible in other embodiments of the present disclosure.

The at least one detent 404 may include four detent protrusions 408 that project radially outwardly at ninety degree intervals about the central axis 417, and one of the four detent protrusions 408 may be radially aligned with the tab 406. This may not be the case for other embodiments of the present disclosure.

The retainer 400 may define two radially extending planes of symmetry 412 that are perpendicular to each other, but not necessarily so.

Next, various embodiments of a pin that may be provided as a replacement part, etc. will now be described with reference to FIGS. 33, 37, and 44.

Such a pin 600, 600a, and 600b includes a head 608, 608a, 608b defining a head dimension 618 (e.g. a head diameter), 618a (e.g. a head diameter), 618b (e.g. a head width measured along a direction perpendicular to the shaft axis), and a shaft 612, extending from the head 608, 608a, 608b. The shaft may define a peripheral surface 604, and a shaft diameter 620 that is less than head dimension 618, 618a, 618b. The peripheral surface 604 (e.g. a surface of revolution such as a cylindrical surface, a conical surface, etc.) may define a notch 606, and the head 608, 608a, 608b may include a perimetric surface 622, 622a, 622b including an orientation feature 624.

The orientation feature 624 includes at least one of the following: a flat 616, an indentation 610, 610a, and a protrusion (e.g. such as shown on the various wear members/working members). The notch 606 may include a concave arcuate surface 614 has previously described herein.

The shaft 612, 612a, 612b may define a shaft axis 626 (e.g. a cylindrical axis, a longitudinal axis, etc.), and a free end 602, 602a, 602b disposed along the shaft axis 626. The notch 606 may be disposed along the shaft axis 626 near the free end 602, 602a, 602b or near the head 608, 608a, 608b depending on the application.

Figure 45:
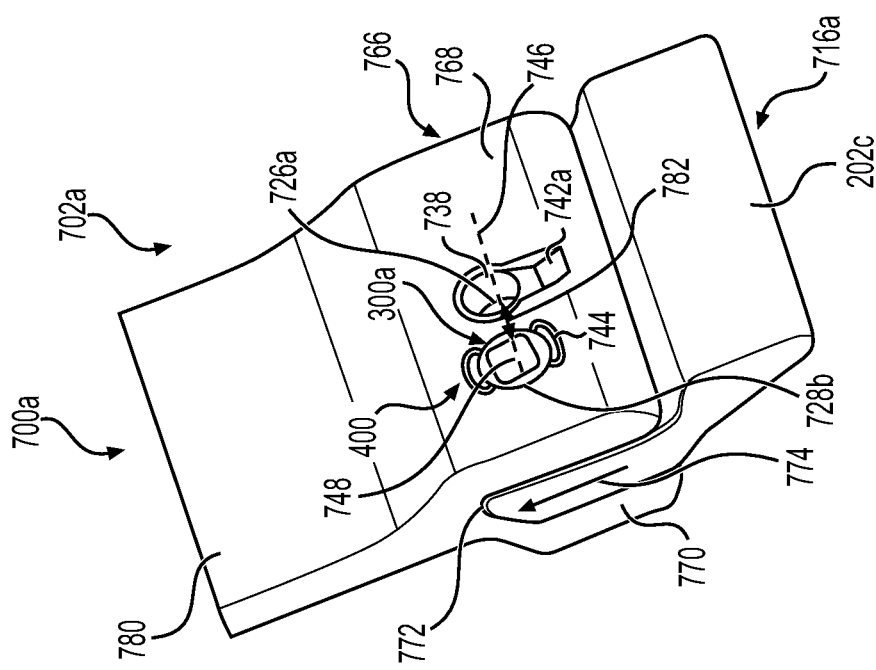
FIG. 45 illustrates the cutting edge of FIG. 43 with assembled into the bottom forked section of a blade portion with the lock in the unlocked configuration.

A blade member that may be provided as a replacement part, etc. will now be discussed with reference to FIG. 45.

The blade member 702b may comprise an upper straight section 780, and a bottom forked section 766 including a front prong 768, a rear prong 770 that are spaced apart from each other, defining a cutting edge receiving slot 772 therebetween, and a direction of assembly 774.

Either the front prong 768 or the rear prong 770, or both defines a pin receiving thru-hole 726b, a retainer receiving cavity 744, and a lock receiving aperture 728b. The pin receiving thru-hole 726b may define a longitudinal axis 746, and the lock receiving aperture 728b may define an axis of rotation 748, a radial direction 750, and a circumferential direction 752 (see also FIG. 47). The axis of rotation 748 may be parallel to the longitudinal axis 746, and may be spaced away from the longitudinal axis 746 a predetermined minimum distance 782.

As previously described with reference to other embodiments herein, the bottom forked section may further define a wing receiving slot that is in communication with the lock receiving aperture, and that extends circumferentially and radially from the lock receiving aperture, and the retainer receiving cavity includes a tab receiving slot that extends radially and circumferentially from the lock receiving aperture, the tab receiving slot defining an angular extent circumferentially that ranges from 80 degrees to 100 degrees.

Any of the aforementioned configurations, dimensions, and materials may be altered to be different in other embodiments of the present disclosure.

INDUSTRIAL APPLICABILITY

In practice, an adaptor board assembly, a ripper shank and ripper tip subassembly, a blade assembly, a retaining system, a lock, a retainer, a work tool/wear member, an adaptor board, a ripper shank, a pin, etc. may be manufactured, bought, assembled, or sold to retrofit an existing machine or adaptor board assembly, ripper shank and ripper tip subassembly, blade assembly, etc. in the field or be supplied as a replacement part. In other situations, these items may be supplied or obtained when a machine or an assembly is originally bought from the OEM (original equipment manufacturer), etc.

The adaptor board assembly may be assembled by first inserting the retainer into the annular cavity of the lock to form a subassembly. Then, both the lock and retainer are inserted into the appropriate apertures of the adaptor board assembly to hold them in adaptor board assembly so that these components do not unintentionally fall out. Undercuts or dimensional interferences may be provided between the retainer, the lock, and the adaptor board to achieve this result.

Once installed, a square driver or the like may be used to rotate the lock into an unlocked configuration. Then, the work tool/wear member may inserted into the adapter board with this shank passing at least partially through the lock. This step may continue until the shank is seated within the adaptor board. The angular orientation of the shank must be such that the notches are facing toward the lock. The assembly may be fool proofed (poka-yoke) by using a key/key way interface or providing cross-sectional shape of the shank that is not capable of being inserted in different angular orientations (e.g. a trapezoidal cross-section) may be employed, etc.

Next, the lock may be rotated until the lock engages the shank (e.g. by the skirt passing through the notches disposed on the shank). Now, the work tool/wear member is securely attached to the adaptor board.

The work tool/wear member as well as the lock and retainer may be disassembled by reversing one or more of these steps.

The disclosed embodiments of the retaining system allow a square drive to be used that is frequently available in the field, while also allowing the thickness of the bottom portion of the adaptor board along the axis of rotation as seen in FIG. 10 to minimized, reducing the necessary material and the associated cost.

The ripper shank and ripper tip subassembly may be assembled by first assembling the retainer and the lock into the ripper tip. Then, the lock is placed into an unlocked configuration if it is not already. Next, the ripper tip, lock and retainer are inserted over the nose of the ripper shank. After that, the pin is installed with the proper angular orientation so that its notch is able to receive the wing of the lock as previously described herein. Then, the lock is rotated using a square driver into the locked configuration with the wing placed in the notch of the pin. The ripper tip is now secured to the ripper shank.

Disassembly may be effectuated by reversing these steps. To remove the pin, either the free end of the pin may be hammer out or the head of the pin may be pried out as previously alluded to herein.

The blade assembly of FIGS. 35 thru 42 may be assembled by first assembling the retainer and the lock into the cutting edge. Then, the lock is placed into an unlocked configuration if it is not already. Next, the cutting edge, lock and retainer are inserted over the lip of the blade. After that, the pin is installed with the proper angular orientation so that its notch is able to receive the wing of the lock as previously described herein. Then, the lock is rotated using a square driver into the locked configuration with the wing placed in the notch of the pin. The cutting edge is now secured to the blade.

Disassembly may be effectuated by reversing these steps. To remove the pin, either the free end of the pin may be hammer out or the head of the pin may be pried out as previously alluded to herein.

The blade assembly of FIGS. 43 thru 49 may be assembled by first assembling the retainer and the lock into the blade member. Then, the lock is placed into an unlocked configuration if it is not already. Next, the cutting edge is inserted into the bottom forked section of the blade member. After that, the pin is installed with the proper angular orientation so that its notch is able to receive the wing of the lock as previously described herein. Then, the lock is rotated using a square driver into the locked configuration with the wing placed in the notch of the pin. The cutting edge is now secured to the blade member.

Disassembly may be effectuated by reversing these steps. To remove the pin, either the free end of the pin may be hammer out or the head of the pin may be pried out as previously alluded to herein.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A retaining system comprising:
a lock including a drive portion, an axis of rotation, a radial direction, and a circumferential direction, and a shank locking portion comprising a skirt that is connected to the drive portion by a web, the skirt extending axially from the web toward the drive portion forming an annular cavity, defining at least one detent receiving aperture that is disposed in the annular cavity.

2. The retaining system of claim 1 wherein the skirt of the lock extends axially from the web away from the drive portion, forming the shank locking portion, the skirt also defining at least one shank receiving aperture.

3. The retaining system of claim 2 wherein the skirt includes an interior wall facing toward the drive portion of the lock, and the at least one detent receiving aperture is disposed on the interior wall of the skirt.

4. The retaining system of claim 1 wherein the drive portion defines a drive recess having a rectangular configuration.

5. The retaining system of claim 3 further comprising a retainer that is disposed in the annular cavity and includes a wavy annular body having at least one detent that is configured to mate with the at least one detent receiving aperture, and a first tab that extends axially away from the wavy annular body, that is disposed radially adjacent to the drive portion of the lock.

6. The retaining system of claim 5 wherein the at least one shank receiving aperture of the skirt of the lock includes two radially aligned shank receiving apertures.

7. The retaining system of claim 6 wherein the at least one detent receiving apertures of the skirt of the lock includes four detent receiving grooves that are disposed on the interior wall of the skirt spaced circumferentially about the axis of rotation at ninety degree intervals, and that at least one detent of the retainer includes four detent protrusions that project outwardly radially from the wavy annular body of the retainer.

8. The retaining system of claim 7 further comprising a second tab that is identically configured as the first tab, being disposed at a 180 degree interval about the axis of rotation, and the first and the second tab are radially aligned with one of the four detent protrusions.

9. The retaining system of claim 8 wherein the wavy annular body includes an interior peripheral wall, defining a plurality of flex grooves, with one of the plurality of grooves radially aligned with one of the four detent protrusions, each of the flex grooves extending axially completely through retainer.

10. The retaining system of claim 8 wherein the wavy annular body defines an enclosed perimeter, and the first and the second tabs define angular extents measured in the circumferential direction that range from 80 degrees to 100 degrees.

* * * * *